(12) United States Patent
Boothby et al.

(10) Patent No.: US 11,422,958 B2
(45) Date of Patent: Aug. 23, 2022

(54) SYSTEMS AND METHODS FOR EFFICIENT INPUT AND OUTPUT TO QUANTUM PROCESSORS

(71) Applicant: D-WAVE SYSTEMS INC., Burnaby (CA)

(72) Inventors: Kelly T.R. Boothby, Vancouver (CA); Andrew J. Berkley, Vancouver (CA); Christopher B. Rich, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 38 days.

(21) Appl. No.: 16/872,595

(22) Filed: May 12, 2020

(65) Prior Publication Data
US 2020/0371974 A1 Nov. 26, 2020

Related U.S. Application Data

(60) Provisional application No. 62/851,377, filed on May 22, 2019.

(51) Int. Cl.
*G06F 13/20* (2006.01)
*G06F 13/42* (2006.01)
(Continued)

(52) U.S. Cl.
CPC .......... *G06F 13/20* (2013.01); *G06F 9/30134* (2013.01); *G06F 13/42* (2013.01); *G06N 10/00* (2019.01)

(58) Field of Classification Search
CPC ...... G06F 13/20; G06F 13/42; G06F 9/30314; G06N 10/00
See application file for complete search history.

(56) References Cited

U.S. PATENT DOCUMENTS

| 4,275,314 A | 6/1981 | Fulton |
| 4,785,426 A | 11/1988 | Harada et al. |

(Continued)

FOREIGN PATENT DOCUMENTS

| CN | 106505962 A | 3/2017 |
| SU | 539333 A1 | 12/1976 |

(Continued)

OTHER PUBLICATIONS

Aaronson, "Thanksgiving Special: D-Wave at MIT," Shteti-Optimized—The Blog of Scott Aaronson, URL=http://www.scottaaronson.com/blog/?p=291, retrieved Apr. 14, 2011 (originally retrieved Nov. 28, 2007), 54 pages.

(Continued)

*Primary Examiner* — Henry Tsai
*Assistant Examiner* — John B Roche
(74) *Attorney, Agent, or Firm* — Cozen O'Connor

(57) ABSTRACT

A quantum processor performs input and output which may be performed synchronously. The quantum processor executes a problem to generate a classical output state, which is read out at least partially by an I/O system. The I/O system also transmits a classical input state to by the I/O system, which may include the same qubit-proximate devices used for read-out. The classical input state is written to the qubits, and the quantum processor executes based on the classical input state (e.g., by performing reverse annealing to transform the classical input state to quantum state).

33 Claims, 14 Drawing Sheets

(51) Int. Cl.
*G06N 10/00* (2022.01)
*G06F 9/30* (2018.01)

(56) References Cited

U.S. PATENT DOCUMENTS

| | | |
|---|---|---|
| 4,947,118 A | 8/1990 | Fujimaki |
| 5,153,171 A | 10/1992 | Smith et al. |
| 5,248,941 A | 9/1993 | Lee et al. |
| 5,528,202 A | 6/1996 | Moline et al. |
| 6,356,078 B1 | 3/2002 | Ganther et al. |
| 6,437,413 B1 | 8/2002 | Yamaguchi et al. |
| 6,597,010 B2 | 7/2003 | Eriksson et al. |
| 6,627,915 B1 | 9/2003 | Ustinov et al. |
| 6,670,630 B2 | 12/2003 | Blais et al. |
| 6,784,451 B2 | 8/2004 | Amin et al. |
| 6,822,255 B2 | 11/2004 | Tzalenchuk et al. |
| 6,838,694 B2 | 1/2005 | Esteve et al. |
| 6,885,325 B2 | 4/2005 | Omelyanchouk et al. |
| 6,897,468 B2 | 5/2005 | Blais et al. |
| 6,960,780 B2 | 11/2005 | Blais et al. |
| 6,979,836 B2 | 12/2005 | Zagoskin et al. |
| 6,984,846 B2 | 1/2006 | Newns et al. |
| 6,987,282 B2 | 1/2006 | Amin et al. |
| 7,015,499 B1 | 3/2006 | Zagoskin |
| 7,109,593 B2 | 9/2006 | Freedman et al. |
| 7,135,701 B2 | 11/2006 | Amin et al. |
| 7,277,872 B2 | 10/2007 | Raussendorf et al. |
| 7,418,283 B2 | 8/2008 | Amin |
| 7,533,068 B2 | 5/2009 | Maassen et al. |
| 7,619,437 B2 | 11/2009 | Thom et al. |
| 7,624,088 B2 | 11/2009 | Johnson et al. |
| 7,843,209 B2 | 11/2010 | Berkley |
| 7,876,248 B2 | 1/2011 | Berkley et al. |
| 7,898,282 B2 | 3/2011 | Harris et al. |
| 7,932,514 B2 | 4/2011 | Farinelli et al. |
| 7,969,805 B2 | 6/2011 | Thom et al. |
| 8,008,942 B2 | 8/2011 | Van et al. |
| 8,018,244 B2 | 9/2011 | Berkley |
| 8,035,540 B2 | 10/2011 | Berkley et al. |
| 8,098,179 B2 | 1/2012 | Bunyk et al. |
| 8,169,231 B2 | 5/2012 | Berkley |
| 8,190,548 B2 | 5/2012 | Choi |
| 8,195,596 B2 | 6/2012 | Rose et al. |
| 8,283,943 B2 | 10/2012 | Van Den Brink et al. |
| 8,421,053 B2 | 4/2013 | Bunyk et al. |
| 8,536,566 B2 | 9/2013 | Johansson et al. |
| 8,686,751 B2 | 4/2014 | Van Den Brink et al. |
| 8,786,476 B2 | 7/2014 | Bunyk et al. |
| 8,812,066 B2 | 8/2014 | Lanting et al. |
| 8,854,074 B2 | 10/2014 | Berkley |
| 8,933,695 B1 | 1/2015 | Kornev et al. |
| 8,951,808 B2 | 2/2015 | Ladizinsky et al. |
| 9,015,215 B2 | 4/2015 | Berkley et al. |
| 9,069,928 B2 | 6/2015 | Van Den Brink et al. |
| 9,183,508 B2 | 11/2015 | King |
| 9,335,385 B2 | 5/2016 | Lanting et al. |
| 9,509,274 B2 | 11/2016 | Naaman et al. |
| 9,779,360 B2 * | 10/2017 | Bunyk ............... G06F 30/20 |
| 10,050,630 B2 | 8/2018 | Reagor et al. |
| 10,074,792 B1 | 9/2018 | Ferguson et al. |
| 10,235,635 B1 * | 3/2019 | Abdo ............... G06N 10/00 |
| 10,333,047 B2 | 6/2019 | Gilbert et al. |
| 10,381,542 B2 | 8/2019 | Chang et al. |
| 10,404,214 B2 | 9/2019 | Szöcs et al. |
| 10,516,375 B2 | 12/2019 | Bell et al. |
| 10,528,886 B2 | 1/2020 | Boothby |
| 10,811,588 B2 * | 10/2020 | Olivadese ............ H01L 39/223 |
| 11,100,416 B2 | 8/2021 | Lanting et al. |
| 2002/0121636 A1 | 9/2002 | Amin et al. |
| 2002/0188578 A1 | 12/2002 | Amin et al. |
| 2002/0190381 A1 | 12/2002 | Herr et al. |
| 2003/0055513 A1 | 3/2003 | Raussendorf et al. |
| 2003/0107033 A1 | 6/2003 | Tzalenchuk et al. |
| 2003/0121028 A1 | 6/2003 | Coury et al. |
| 2003/0169041 A1 | 9/2003 | Coury et al. |
| 2003/0173498 A1 | 9/2003 | Blais et al. |
| 2004/0000666 A1 | 1/2004 | Lidar et al. |
| 2004/0016918 A1 | 1/2004 | Amin et al. |
| 2004/0119061 A1 | 6/2004 | Wu et al. |
| 2004/0140537 A1 | 7/2004 | Il et al. |
| 2004/0155728 A1 | 8/2004 | Cheung et al. |
| 2004/0165454 A1 | 8/2004 | Amin et al. |
| 2004/0170047 A1 | 9/2004 | Amin et al. |
| 2004/0239319 A1 | 12/2004 | Tralshawala et al. |
| 2005/0082519 A1 | 4/2005 | Amin et al. |
| 2005/0184284 A1 | 8/2005 | Burkard et al. |
| 2005/0224784 A1 | 10/2005 | Amin et al. |
| 2005/0250651 A1 | 11/2005 | Amin et al. |
| 2005/0256007 A1 | 11/2005 | Amin et al. |
| 2006/0097746 A1 | 5/2006 | Amin |
| 2007/0096730 A1 | 5/2007 | Meyer et al. |
| 2007/0241747 A1 | 10/2007 | Morley et al. |
| 2008/0176750 A1 | 7/2008 | Rose et al. |
| 2009/0070402 A1 | 3/2009 | Rose et al. |
| 2009/0078931 A1 * | 3/2009 | Berkley ............... B82Y 10/00 257/31 |
| 2009/0082209 A1 | 3/2009 | Bunyk et al. |
| 2009/0121215 A1 | 5/2009 | Choi |
| 2009/0122508 A1 | 5/2009 | Uchaykin et al. |
| 2009/0168286 A1 | 7/2009 | Berkley et al. |
| 2009/0206871 A1 | 8/2009 | Baumgardner et al. |
| 2009/0289638 A1 | 11/2009 | Farinelli et al. |
| 2009/0319757 A1 | 12/2009 | Berkley |
| 2010/0097056 A1 | 4/2010 | Lam et al. |
| 2011/0031462 A1 | 2/2011 | Jedema et al. |
| 2011/0060780 A1 | 3/2011 | Berkley et al. |
| 2011/0089405 A1 | 4/2011 | Ladizinsky et al. |
| 2012/0023053 A1 | 1/2012 | Harris et al. |
| 2012/0094838 A1 | 4/2012 | Bunyk et al. |
| 2012/0098594 A1 | 4/2012 | Zmuidzinas et al. |
| 2012/0159272 A1 | 6/2012 | Pesetski et al. |
| 2013/0278283 A1 | 10/2013 | Berkley |
| 2014/0223224 A1 | 8/2014 | Berkley |
| 2014/0337612 A1 * | 11/2014 | Williams ............ G06F 13/36 713/100 |
| 2015/0032993 A1 | 1/2015 | Amin et al. |
| 2015/0032994 A1 | 1/2015 | Chudak et al. |
| 2015/0111754 A1 | 4/2015 | Harris et al. |
| 2015/0119252 A1 | 4/2015 | Ladizinsky et al. |
| 2016/0079968 A1 | 3/2016 | Strand et al. |
| 2016/0112031 A1 | 4/2016 | Abraham et al. |
| 2016/0125309 A1 | 5/2016 | Naaman et al. |
| 2016/0233860 A1 | 8/2016 | Naaman |
| 2017/0344898 A1 | 11/2017 | Karimi et al. |
| 2018/0218279 A1 * | 8/2018 | Lechner ............... G06N 10/00 |
| 2019/0019099 A1 | 1/2019 | Hoskinson et al. |
| 2020/0342959 A1 * | 10/2020 | Tavernelli ............ G06N 10/00 |

FOREIGN PATENT DOCUMENTS

| | | |
|---|---|---|
| WO | 2002027653 | 4/2002 |
| WO | 2005109565 A1 | 11/2005 |
| WO | 2008022410 A1 | 2/2008 |
| WO | 2009099972 A2 | 8/2009 |
| WO | 2009120638 A2 | 10/2009 |
| WO | 2010042735 A2 | 4/2010 |
| WO | 2012155329 A1 | 11/2012 |
| WO | 2014123980 A1 | 8/2014 |
| WO | 2014135749 A1 | 9/2014 |
| WO | 2016127021 A1 | 8/2016 |
| WO | 2016183213 A1 | 11/2016 |

OTHER PUBLICATIONS

Barenco et al., "Elementary gates for quantum computation," Physical Review A 52(5):3457-3467, Nov. 1995.
Barone et al., Physics and Applications of the Josephson Effect, John Wiley & Sons, 1982, pp. 416-427.
Berkley, "Methods of Ferromagnetic and Adiabatic Classical Qubit State Copying," U.S. Appl. No. 60/675,139, filed Apr. 26, 2005, 63 pages.
Blais et al., "Tunable Coupling of Superconducting Qubits," Physical Review Letters 90(12):127901-1-127901-4, Mar. 28, 2003.

(56) References Cited

OTHER PUBLICATIONS

Blatter et al., "Design aspects of superconducting-phase quantum bits," Physical Review B 63:174511-1-174511-9, 2001.
Bryant et al., "introduction to Electronic Analogue Computing," Physics& Mathematics, AEC Research and Development Report, pp. 2-50, Aug. 1966.
Cormen et al., Introduction to Algorithms, The MIT Press, Cambridge, Massachusetts, pp. 964-985, 2000.
Cosmelli et al., "Controllable Flux Coupling for the Integration of Flux Qubits," arXiv:cond-mat/0403690 v1, pp. 1-10, Mar. 29, 2004.
DiVincenzo, "The Physical Implementation of Quantum Computation," Fortschr. Phys. 48:771-783, 2000.
European Search Report, dated Oct. 13, 2010, for EP 05849198.6, 10 pages.
Friedman et al., "Detection of a Schrodinger's Cat State in an rf-SQUID," arXiv:cond-mat/0004293 2:1-7, Apr. 19, 2000.
Garey et al., Computers and Intractability: A Guide to the Theory of NP-Completeness, W. H. Freeman and Company, New York, 1979, pp. 1-15.
Grajcar et al., "Adiabatic Quantum Evolution of Superconducting Flux Qubits," arXiv:cond-mat/0407405 v1, pp. 1-7, Jul. 15, 2004.
Han et al., "Time-Resolved Measurement of Dissipation-Induced Decoherence in a Josephson Junction," Science 293:1457-1459, Aug. 24, 2001.
Inokuchi et al., "Analog computation using quantum-flux parametron devices," Physica C 357-360 :1618-1621, 2001.
Kim et al., "Coupling of Josephson Current Qubits Using a Connecting Loop," Physical Review B 70:184525-1-184525-6, 2004.
Lang, "Analog was not a Computer Trademark!," Sound & Vibration:16-24, Aug. 2000.
Lantz et al., "Josephson Junction Qubit Network with Current-Controlled Interaction," Proceedings of the Fourth International Workshop on Macroscopic Quantum Coherence and Computing (MQC2'04), Jun. 7-10, 2004, 13 pages.
Lidar, "On the quantum computational complexity of the Ising spin glass partition function and of knot invariants," New Journal of Physics 6(167): 1-15, 2004.
Maassen van den Brink et ai., "Analog Processor Comprising Quantum Devices," U.S. Appl. No. 60/705,503, filed Aug. 3, 2005, 71 pages.
Madou, Fundamentals of Microfabrication: The Science of Miniaturization, CRC Press, 2002, pp. 1-14.
Martinis et al., "Rabi Oscillations in a Large Josephson-Junction Qubit," Physical Review Letters 89(11):117901-1-117901-4, Sep. 9, 2002.
Murray et al., "Coupling Methods and Architectures for Information Processing," U.S. Appl. No. 11/247,857, filed Oct. 10, 2005, 73 pages.
Murray et al., "Coupling Schemes for Information Processing," U.S. Appl. No. 60/460,420, filed Dec. 30, 2004, 44 pages.
Nakamura et al., "Coherent control of macroscopic quantum states in a single-Cooper-pair-box," Nature 398:786-788, Apr. 29, 1999.
Niskanen et al., "Quantum Coherent Tunable Coupling of Superconducting Qubits," Science 316:723-726, May 4, 2007.
Plourde et al., "Entangling Flux Qubits with a Bipolar Dynamic Inductance," Physical Review B 70:140501-1-140501-4, 2004.
Ramos et al., "Design for Effective Thermalization of Junctions for Quantum Coherence," IEEE Transactions on Applied Superconductivity 11 (1):998-1001, Mar. 2001.
Rose, "Analog Processor With Quantum Devices," U.S. Appl. No. 60/638,600, filed Dec. 23, 2004, 42 pages.
Strauch, Theory of Superconducting Phase Qubits, UMI Microform, Ann Arbor, Michigan, 2005, Chapter 8, "Conclusion," pp. 298-306.
Van Dam, "Quantum Computing: In the 'Death Zone'?," Nature Physics 3:220-221, Apr. 2007.
Wang et al., "Fast Entanglement of Two Charge-Phase Qubits hrough Nonadiabatic Couling to a Large Josephson Junction," Physical Review B 70:224515-1-224515-4, 2004.
Wei et al., "Quantum Computation with Josephson-Qubits by Using a Current-Biased information Bus," arXiv:cond-mat/0407667 v1, pp. 1-13, Jul. 26, 2004.
Wocjan et al., "Treating the Independent Set Problem by 2D Ising Interactions with Adiabatic Quantum Computing," arXiv:quant-ph/0302027 1:1 -13, Feb. 4, 2003.
You et al., "Controllable Manipulation and Entanglement of Macroscopic Quantum States in Coupled Charge Qubits," Physical Review B 68:024510-1-024510-8, 2003.
B. H. Eom et al., "Wideband, Low-Noise Superconducting Amplifier with High Dynamic Range", arXiv:1201.2392v1 [cond-mat.supr-con], 2012, 23 pages.
Bunyk et al., "Architectural Considerations in the Design of a Superconducting Quantum Annealing Processor," IEEE Trans. Appi. Supercond., 24, arXiv:1401.5504v1 [quant-ph] Jan. 21, 2014, 9 pages.
Communication Pursuant to Rule 164(1) EPC, dated Mar. 3, 2021, for European Application No. 19760892.0, 12 pages.
International Search Report, dated Sep. 30, 2016, for PCT/US2016/031885, 4 pages.
Likharev, "Classical and Quantum Limitations on Energy Consumption in Computation," International Journal of Theoretical Physics 21 (3/4):311-326, 1982.
Likharev, "Dynamics of Some Single Flux Quantum Devices: I. Parametric Quatron," IEEE Transactions on Magnetics MAG-13(1):242-244, 1977.
Written Opinion, dated Sep. 30, 2016, for PCT/US2016/031885, 9 pages.
Barends , et al., "Coherent Josephson Qubit Suitable for Scalable Quantum Integrated Circuits", arXiv:1304.2322 [quant-ph], 2013, 10 pages.
Berkley , et al., "A scalable readout system for a superconducting adiabatic quantum optimization system", arXiv, May 6, 2009, 18 pages.
Bronn, Nicholas T, et al., "Reducing Spontaneous Emission in Circuit Quantum Electrodynamics by a Combined Readout/Filter Technique," arXiv:1504.04353v1 [quant-ph], Apr. 16, 2015, 8 pages.
Casas, Juan , et ai., "A Quantum Flux Parametron (QFP) 12-Bit Shift Register Capable of Stable Microwave Frequency Operation," Japanese Journal of Applied Physics vol. 30, No. 12B, Dec. 1991, pp. 3939-3942.
Chen, Yu , et ai., "Multiplexed dispersive readout of superconducting phase qubits," arXiv:1209.1781V1 [cond-mat. supr-con], Sep. 9, 2012, 4 pages.
Clarke , et al., "Quiet Readout of Superconducting Flux States," Physica Scripta. T102: 173-177, 2002.
Colless, J. I, et al., "Cryogenic High-Frequency Readout and Control Platform for Spin Qubits," arXiv:1111.6440v2 [cond-mat.mes-hall], Nov. 29, 2011, 8 pages,.
Day, Peter K, et al., "A broadband superconducting detector suitable for use in large arrays," Letters to Nature, NATURE, vol. 425, Oct. 23, 2003, pp. 817-821.
Deutsch , "Quantum theory, the Church-Turing principle and the universal quantum computer," Appeared in Proceedings of the Royal Society of London A 400: 97-117, 1985.
Dicarlo, L. , et al., "Preparation and Measurement of Three-Qubit Entanglement in a Superconducting Circuit," arXiv:1004.4324v1 [cond-mat.mes-hall,] Apr. 25, 2010, 9 pages.
Hornibrook, J. M, et al., "Frequency multiplexing for readout of spin qubits," Applied Physics Letters 104, 103108, 2014, 4 pages.
Jeffrey, Evan , et al., "Fast Scalable State Measurement with Superconducting Qubits," arXiv:1401.0257v3 [quant-ph], Jan. 17, 2014, 9 pages.
Jerger, M. , et al., "Frequency division multiplexing readout and simultaneous manipulation of an array of flux qubits," Applied Physics Letter 101, 042604 (2012), 5 pages.
Jerger, M. , et al., "Spectroscopy of a Qubit Array via a Single Transmission Line," arXiv:1102.0404v1 [cond-mat.supr-con], Feb. 2, 2011, 3 pages.
Krantz , et al., "Single-shot Readout of a Superconducting Qubit using a Josephson Parametric Oscillator", arXiv:1508.02886v2 [quant-ph], 2016, 11 pages.

(56) References Cited

OTHER PUBLICATIONS

Majer, J., et ai., "Coupling Superconducting Qubits via a Cavity Bus," arXiv:0709.2135v1 [cond-mat.mes-hall], Sep. 13, 2007, 6 pages.
Manzin, Benjamin A, et al., "Digital readouts for large microwave low-temperature detector arrays," Nuclear Instruments and Methods in Physics Research, Section A, 2006, 3 pages.
McClure, D. T, et al., "Rapid Driven Reset of a Qubit Readout Resonator," arXiv:1503.01456vl [quant-ph], Mar. 4, 2015, 5 pages.
McKenney, et al., "Design considerations for a background limited 350 micron pixel array using lumped element superconducting microresonators", SPIE, Sep. 24, 2012, 10 pages.
Michotte, S., "Qubit dispersive readout scheme with a microstrip squid amplifier," arXiv:0812.0220v1 [cond-mat.supr-con], Dec. 1, 2008, 4 pages.
Monfardini, A., et al., "Nika: A millimeter-wave kinetic inductance camera," Astronomy & Astrophysics, 521, A29 2010, 6 pages.
Palacios-Laloy, A., et al., "Tunable Resonators for Quantum Circuits," J Low Temp Phys (2008) 151: 1034-1042.
Robertson, T. L, et al., "Superconducting quantum interference device with frequency-dependent damping: Readout of flux qubits,"Physical Review B 72, 024513 (2005), 9 pages.
Sank, et al., "Measurement-Induced State Transitions in a Superconducting Qubit: Beyond the Rotating Wave Approximation", arXiv:1606.05721v2 [quant-ph], 2016, 10 pages.
Semenov, et al., "Classical and Quantum Operation Modes of the Reversible Logic Circuits," Department of Physics and Astronomy, Stony Brook University, Stony Brook, New York, Presentation, Dec. 2006, 29 pages.
Shnirman, et al., "Quantum Manipulations of Small Josephson Junctions," Physical Review Letters 79(12): 2371-2374, Sep. 22, 1997.
Swenson, et al., "MAKO: A pathfinder instrument for on-sky demonstration of low-cost 350 micron imaging arrays", arXiv:1211.0315v1 [astro-ph.IM], 2012, 10 pages.
Volkmann, et al., "Low-dissipation multiplexed flux-sensitive readout in superconducting circuits", 2015 15th International Superconductive Electronics Conference (ISEC), 2015, 3 pages.
Wang, Z. L, et al., "Quantum state characterization of a fast tunable superconducting resonator," Applied Physics Letters 102, 163503 (2013), 4 pages.
Whittaker, et al., "Tunable-cavity QED with phase qubits", Physical Review, B 90, 024513, 2014, 15 pages.
Yates, S. J. C, et al., "Faster Fourier transform spectrometer readout for large arrays of microwave kinetic inductance detectors," University of Groningen, Applied Physics Letters, 2009, 5 pages.
Bell et al., "Traveling Wave Parametric Amplifier based on a chain of Coupled Asymmetric SQUIDs", arXiv:1509.04573 [cond-mat.supr-con], Sep. 15, 2015.
Bertet et al., "Dephasing of a Superconducitng Qubit Nduced by Photon Noise", Physical Review Letters 95, Dec. 13, 2005.
Bocko et al., "Prospects for Quantum Coherent Computation Using Superconducting Electronics," IEEE Transactions on Applied Superconductivity 7(2):3638-3641, Jun. 1997.
Chang, "Parametric Microwave Amplifications using a Tunable Superconducting Resonator", University of Waterloo Thesis, Jul. 7, 1905.
Chiarello, "Quantum computing with superconducting quantum interference devices: a possible strategy", Physics Letters A, Dec. 4, 2000.
Drisko et al., "Impedance tuning with photoconductors to 40 GHz", IET Optoelectronics, Jan. 22, 2019.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feldman et al., "Superconducting quantum computing without switches; quantum computing and quantum bits in mesoscopic systems", arXiv:quant-ph/0211158, Nov. 25, 2002,
Feynman, "Simulating Physics with Computers," International Journal of Theoretical Physics 21 (6/7): 467-488, 1982.
Friedman et al., "Quantum superposition of distinct macroscopic states," Nature 406:43-46, Jul. 6, 2000.
Gao, Jiansong, "The Physics of Superconducting Microwave Resonators," Thesis, In Partial Fulfillment of the Requirements for the Degree of Doctor of Philosophy, California institute of Technology Pasadena, California, May 28, 2008, 197 pages.
Harris et al., "A Compound Josephson Junction Coupler for Flux Qubits with Minimal Crosstalk," arXiv:0904.37841 [cond-mat.supr-con] Apr. 24, 2009, 4 pages.
Harris et al., "Sign and Magnitude Tunable Coupler for Superconducting Flux Qubits," arXiv:cond-mat/0608253v1 [cond-mat.supr-con], Aug. 11, 2006. 5 pages.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
Il'ichev et al., "Continuous Monitoring of Rabi Oscillations in a Josephson Flux Qubit," Physical Review Letters 91 (9): 097906-1-097906-4, week ending Aug. 29, 2003.
International Search Report and Written Opinion for PCT/US2019/018792 dated Jun. 3, 2019, 13 pages.
International Search Report and Written Opinion for PCT/US2019/030914 dated Sep. 4, 2019, 8 pages.
Ioffe et al., "Environmentally decoupled sds—Wave Josephson junctions for quantum computing", Nature 398, p. 679-681 (1999).
Johnson et ai., "Scalable Control System for a Superconducting Adiabatic Quantum Optimization Processor," Superconductor Science & Technology (2010).
Likharev et al., "Reversible Conveyor Computaion in Array of Parametric Quantrons", IEEE Transactions on Magnetics, Mar. 1, 1985.
Lupascu et al., "High-contrast dispersive readout of a superconducting flux qubit using a nonlinear resonator" arXiv: cond-mat/0601634 [cond-mat.mes-hall], Jan. 27, 2006.
Maassen van den Brink et al., "Tunable Coupling of flux qubits through a simple flux transformer".
Majer et al., "Spectroscopy on Two Coupled Superconducting Flux Qubits," Physical Review Letters 94:090501-1-090501-4, 2005.
Makhlin et al., "Quantum-state engineering with Josephson-junction devices," Reviews of Modern Physics 73 (2):357-400, Apr. 2001.
Mooij et al., "Josephson Persistent-Current Qubit," Science 285:1036-1039, Aug. 13, 1999.
Nielsen et al., Quantum Computation and Quantum Information, Cambridge University Press, Cambridge, 2000, "7,8 Other implementation schemes," pp. 343-345.
Oppenländer et al., "Non-periodic Macroscopic Quantum Interference in One-Dimensional Parallel Josephson Junction Arrays With Unconventional Grating Structure" Physical Review B 63, Dec. 20, 2000.
Orlando et al., "Superconducting persistent-current qubit," Physical Review B 60(22):15398-15413, Dec. 1, 1999.
Ortlepp et al., "Access Time and Power Dissipation of a Model 256-Bit Single Flux Quantum RAM", IEEE Transactions on Applied Superconductivity, Sep. 2014.
Ortlepp et al., "Design guidelines for Suzuki stacks as reliable high-speed Josephson voltage drivers", Supercond. Sci. Technol., Jan. 21, 2013.
Paternosto et al., "Quantum-state transfer in imperfect artificial spin networks", Physical Review A 71, Jul. 7, 2004.
Petersan et al., "Measurement of resonant frequency and quality factor of microwave resonators: Comparison of methods," Journal of Applied Physics, vol. 84, No. 6, Sep. 15, 1998, 11 pages.
Planat et al., "A photonic crystal Josephson traveling wave parametric amplifier", Physical Review X, Apr. 28. 2020.
Pobell, "The 3He-4He Dilution Refrigerator", Springer-Verlag Berlin Heidelberg, Jun. 18, 1905.
Shor, "Introduction to Quantum Algorithms," AT&T Labs—Research, arXiv:quant-ph/0005003 v2, pp. 1-17, Jul. 6, 2001.
Swenson et al., "Operation of a titanium nitride superconducting microresonator detector in the nonlinear regime," arXiv:1305.4281v1 [cond-mat.supr-con], May 18, 2013, 11 pages.

(56) References Cited

OTHER PUBLICATIONS

Tavares, "New Algorithms for Quadratic Unconstrained Binary Optimization (Qubo) With Applications in Engineering and Social Sciences", dissertation, Rutgers, May 1, 2008.
Venugopal et al., "Dynamic Blocking and Collapsing for Gibbs Sampling", arXiv:1309.6870 [cs.AI], Sep. 1, 1993.
Volkmann, "Distributed resonator design for For Fortuna", Sep. 22, 2016.
White et al., "Traveling wave parametric amplifier with Josephson junctions using minimal resonator phase matching", Applied Physics Letters 106, Jun. 15, 2015.
You et al., "Fast Two-Bit Operations in Inductively Coupled Flux Qubits," arXiv:cond-mat/0309491 v1, pp. 1-5, Sep. 22, 2003.
Zorin et al., "Traveling-Wave Parametric Amplifier Based on Three-Wave Mixing in Josephson Metarnaterial", arXiv:1705.02859 [cond-mat.supr-con], May 8, 2017.
Shulga, K.V., et al., "Magnetically induced transparency of a quantum," Nature Communications, Jan. 11, 2018, 6 pages., Jan. 11, 2018.
Lanting, Trevor, "Development of Quantum Annealing Technology at D-Wave Systems", retrieved from https://beyondcmos.ornl.gov/documents/Session2, Nov. 29, 2017, 25 pages., Nov. 29, 2017.
Whittaker, J.D., et al., "A frequency and sensitivity tunable microresonator array for high-speed quantum," arXiv:1509.05811v2 [quant-ph], Apr. 22, 2016, 8 pages., Apr. 22, 2016.

\* cited by examiner

SYSTEMS AND METHODS FOR EFFICIENT INPUT AND OUTPUT TO QUANTUM PROCESSORS

FIELD

This disclosure generally relates to input/output systems and methods for quantum processors.

BACKGROUND

Quantum processors typically have several phases of operation when processing a problem, including programming (input), execution, and read-out (output). Programming and read-out tend to be costly in terms of both time and space. For instance, it is not uncommon for the bulk of devices on a quantum processor to be devoted to input and output. Even then, as quantum processors achieve some level of scale (e.g., expanding to thousands of qubits), some degree of serialization is often required due to, e.g., limitations on the number of devices which may be incorporated into the processor and/or the bandwidth of communication with devices external to the processor. The result is that programming and read-out often dominate the time required to process a problem.

Part of the complexity arises from the physics of quantum processors. In a quantum annealing processor, for example, the processor's qubits generally begin the annealing process in superposition and end the annealing process in a classical state. Programming a processor in superposition (e.g., by applying a transverse field, such as one or more flux biases) and performing read-out of a processor in a classical state (e.g., by latching qubits to adjacent devices to transfer spin state) are markedly different physical operations, generally requiring different devices at some stage of input/output.

Various techniques have been proposed to improve the efficiency of input and/or output for quantum processors. For example, U.S. patent application Ser. No. 15/726,239 discloses braided control lines for certain I/O devices and U.S. patent application Ser. No. 15/572,731 discloses frequency-multiplexed resonator input and/or output. However, I/O times still often dominate the time required for a quantum processor to process a problem.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to provide efficient input and/or output for quantum processors. Some aspects of the present disclosure provide systems and methods for synchronous input and output to a quantum processor. The quantum processor comprises a plurality of qubits coupleable to an input-output system comprising a bus. The method is performed by the quantum processor and comprises: executing the problem and thereby generating a first output state based on a problem represented by the quantum processor; reading at least a first portion of the first output state from at least a first subset of the qubits to the bus; transmitting the first portion of the first output state along the bus to an output destination; synchronously with transmitting the first portion of the first output state, transmitting at least a first portion of a first input state along the bus from an input source; writing the first portion of the first input state to the first subset of the qubits; and executing the problem and thereby generate a second output state based on the first portion of the first input state.

In some implementations, executing the problem based on the first portion of the first input state comprises executing the problem in reverse from the first input state to a second output state, the first input state comprising a classical state and the second output state comprising a quantum state.

In some implementations, the quantum processor comprises a quantum annealing processor and executing the problem in reverse comprises reverse annealing.

In some implementations, executing the problem and thereby generating a second output state comprises generating a first intermediate state by reverse annealing and generating the second output state, at least in part, by forward annealing.

In some implementations, the bus comprises a plurality of shift registers and transmitting the at least a first portion of the first input state along the bus synchronously with transmitting the first portion of the first output state along the bus comprises synchronously shifting the first portion of the first input state and the first portion of the first output state along the bus.

In some implementations, the input-output system comprises a plurality of latches, the plurality of qubits coupleable to the bus via the plurality of latches. Reading at least the first portion of the first output state from at least the first subset of the qubits to the bus comprises: reading the first output state from the plurality of qubits to the plurality of latches, and reading at least the first portion of the first output state from at least a first subset of the plurality of latches to the bus, the at least the first subset of the plurality of latches corresponding to the at least the first subset of the qubits.

In some implementations, the method comprises storing at least a second portion of the first output state by the plurality of latches while transmitting at least some of the first portion of the first output state along the bus.

In some implementations, synchronously shifting the first portion of the first input state and the first portion of the first output state along the bus comprises setting a first subset of the plurality of shift registers to latch and setting a second subset of the plurality of shift registers to suppress.

In some implementations, setting the first subset of the plurality of shift registers to latch comprises setting a first latched shift register to latch, the first latched shift register neighboring a first holding shift register in a first direction, and setting the second subset of the plurality of shift registers to suppress comprises setting a first suppressed shift register to suppress, the first suppressed shift register neighboring the first holding shift register in a second direction opposing the first direction, the first holding shift register holding a unit of the first portion of the first input state.

In some implementations, setting the first subset of the plurality of shift registers to latch comprises setting a second latched shift register to latch, the second latched shift register neighboring a second holding shift register in the first direction, and setting the second subset of the plurality of shift registers to suppress comprises setting a second suppressed shift register to suppress, the first suppressed shift register neighboring the second holding shift register in the second direction opposing the first direction, the second holding shift register holding a unit of the first portion of the first output state.

In some implementations, synchronously shifting the first portion of the first input state and the first portion of the first output state along the bus comprises synchronously shifting the first portion of the first input state and the first portion of the first output in the first direction.

In some implementations, the method comprises: reading at least a first portion of the second output state from at least the first subset of the qubits to the bus; transmitting the first portion of the second output state along the bus to the output destination; synchronously with transmitting the first portion of the second output state, transmitting at least a first portion of a second input state along the bus from the input source; writing the first portion of the second input state to the first subset of the qubits; executing the problem and thereby generate a third output state based on the first portion of the second input state.

In some implementations, the method comprises discarding at least a second portion of the first output state.

In one implementation an input-output system for a quantum processor, is provided, the quantum processor comprising a plurality of qubits, the input-output system comprising: an input interface and an output interface, a bus connected between the input interface and the output interface, and a plurality of latches, the bus being communicatively coupled to the plurality of qubits by the plurality of latches.

In other implementations, the input interface and the output interface may each comprise one of a frequency-multiplexed resonator, a frequency and sensitivity tunable resonator, and a digital to analog converter, the plurality of latches may comprise a bus proximate latch, an intermediate latch, and a qubit proximate latch, the qubit proximate latch being coupled to the plurality of qubits, the intermediate latch being coupled to the qubit proximate latch and the bus proximate latch, and the bus proximate latch being coupled to the bus, the bus may comprise a first plurality of shift registers arranged in series and wherein each latch of the plurality of latches comprises a second plurality of shift registers arranged in series, each shift register of the first and second plurality of shift registers may comprise a quantum flux parametron, each quantum flux parametron may be addressed by a flux bias line, and each quantum flux parametron may have a suppressed state wherein the flux bias line introduces zero flux and a latched state wherein the flux bias line introduces non-zero flux, each shift register of the first and second plurality of shift registers may be controllable by at least one of: individually, as subsets of commonly-controlled shift registers, and in groups of shift registers that are in series, and each shift register of the first and second plurality of shift registers is proximately coupled only to independently-controllable shift registers.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings.

Figure 2:
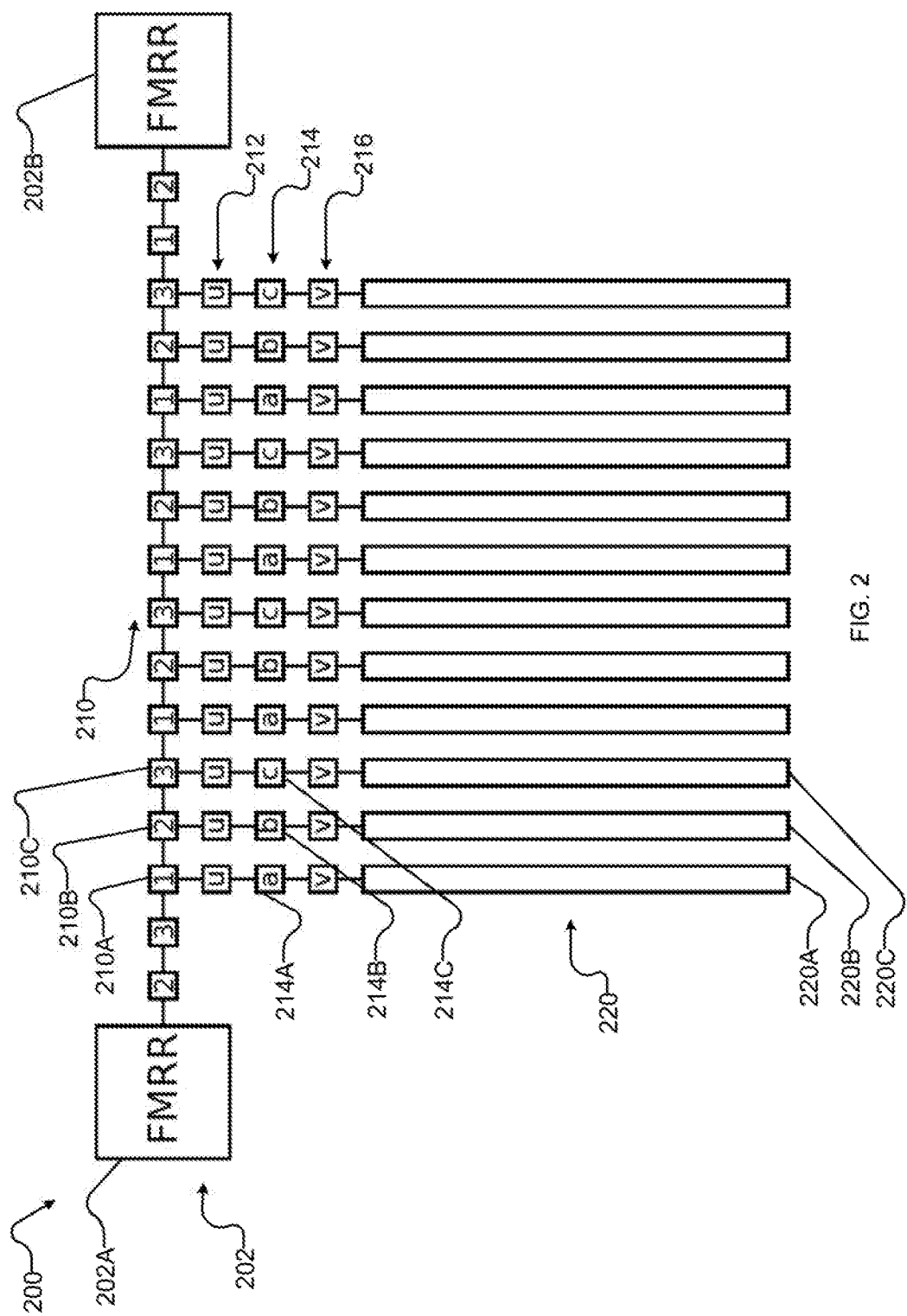
FIG. 2 shows schematically an example I/O system for an example quantum processor such as may be provided by the quantum computer of FIG. 1.
Figure 3:
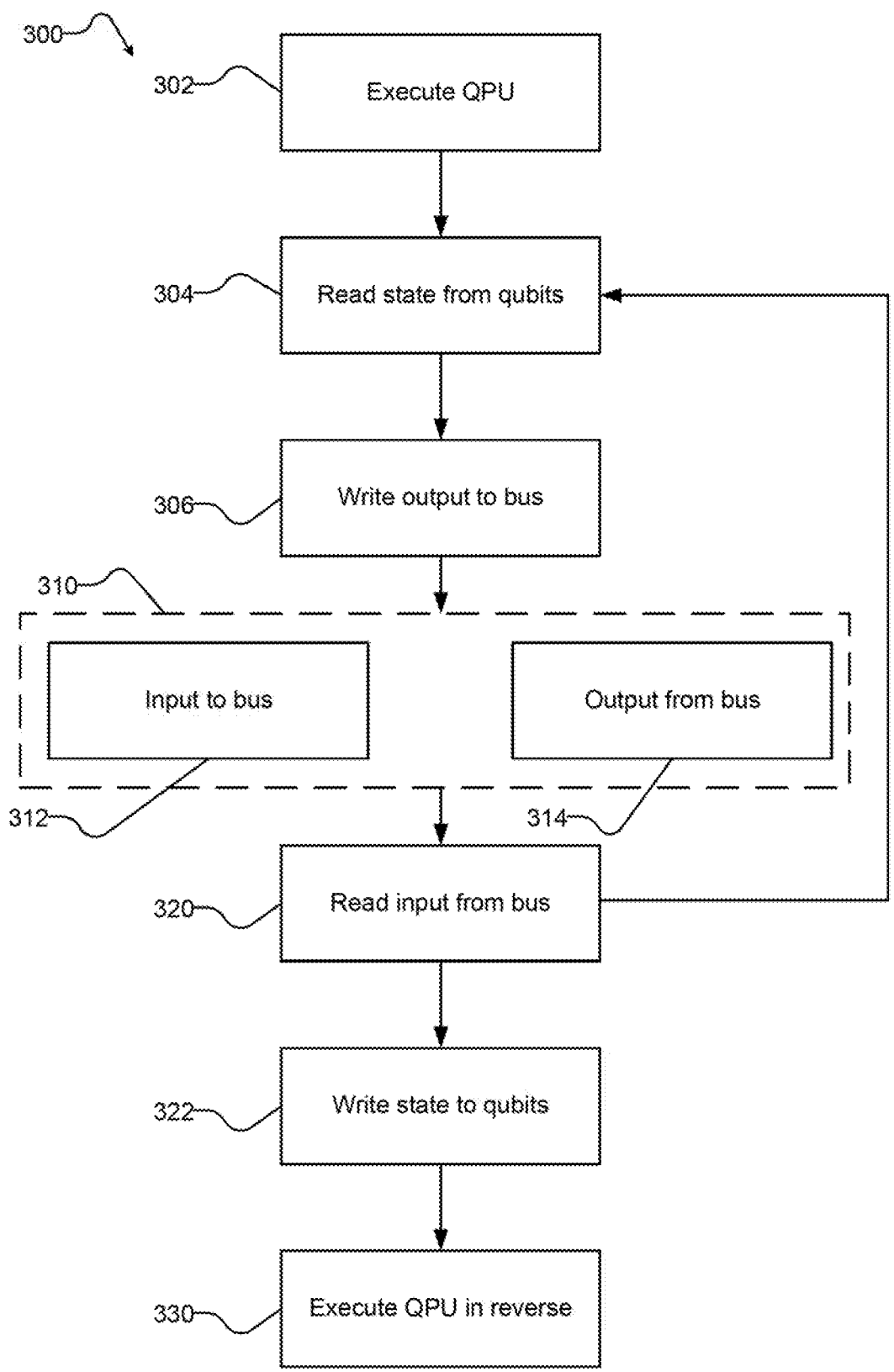
FIG. 3 is a flowchart illustrating an example method for synchronous input and output to an example quantum processor such as the quantum processor of FIG. 2.
Figure 4A:
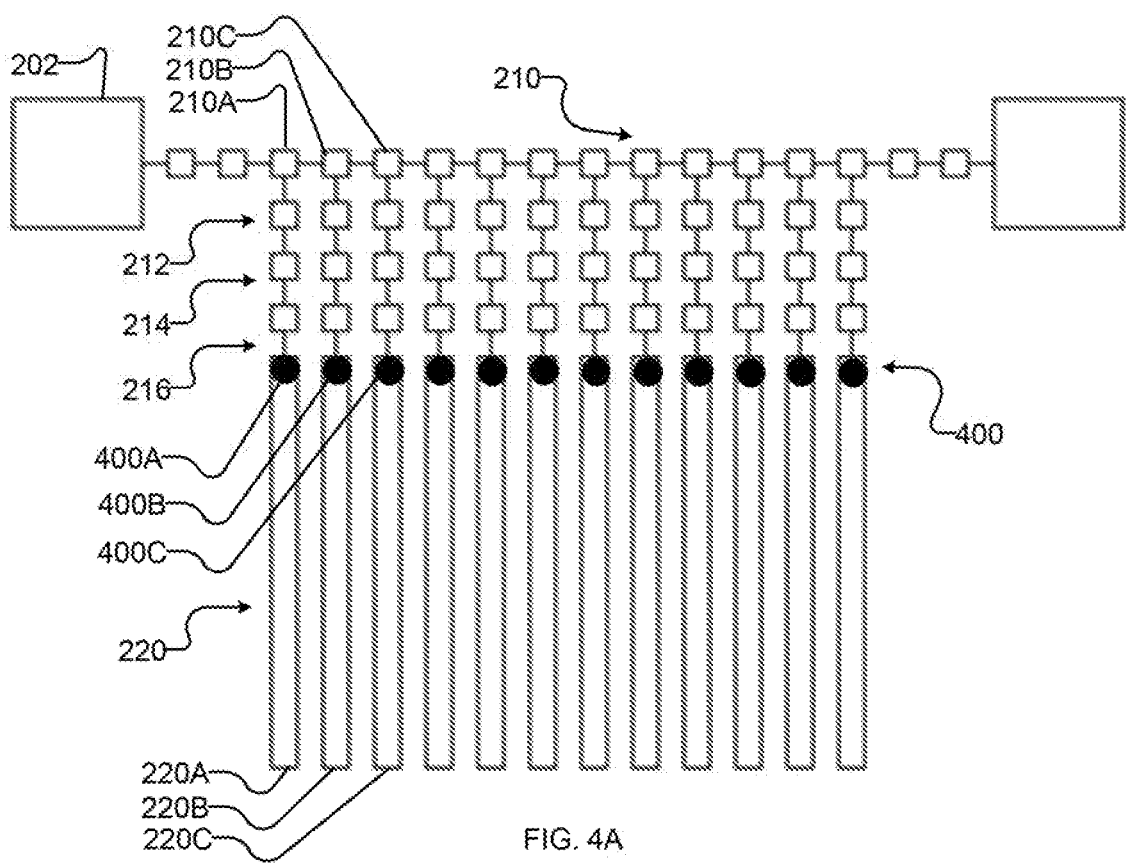
Figure 4B:
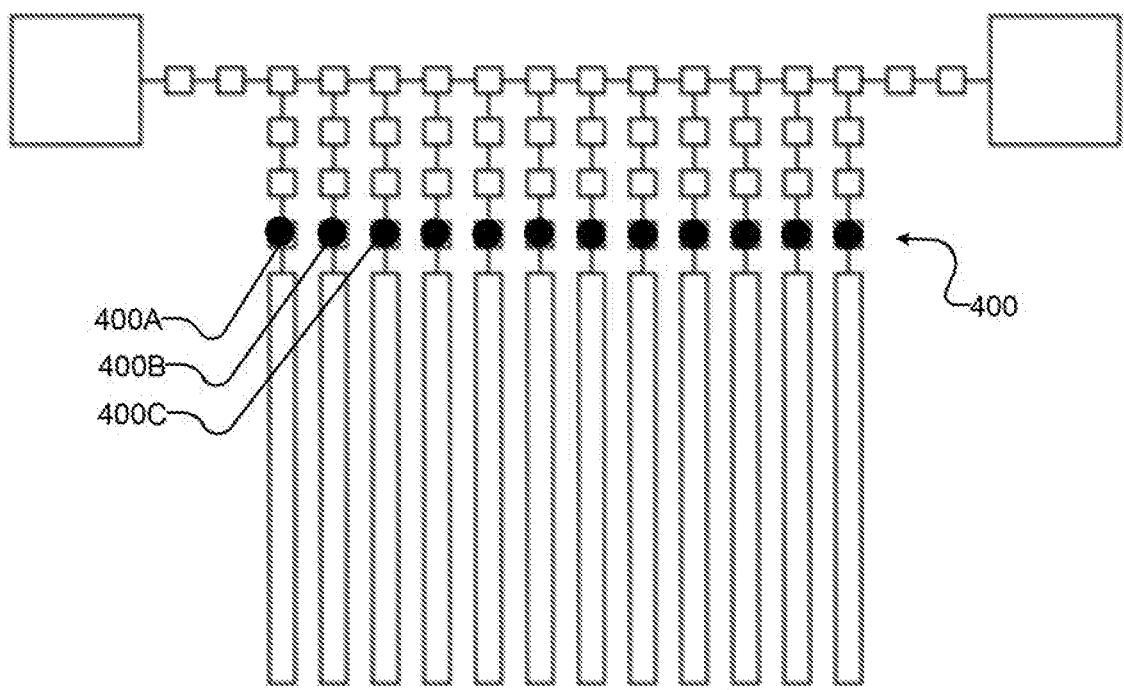
Figure 4C:
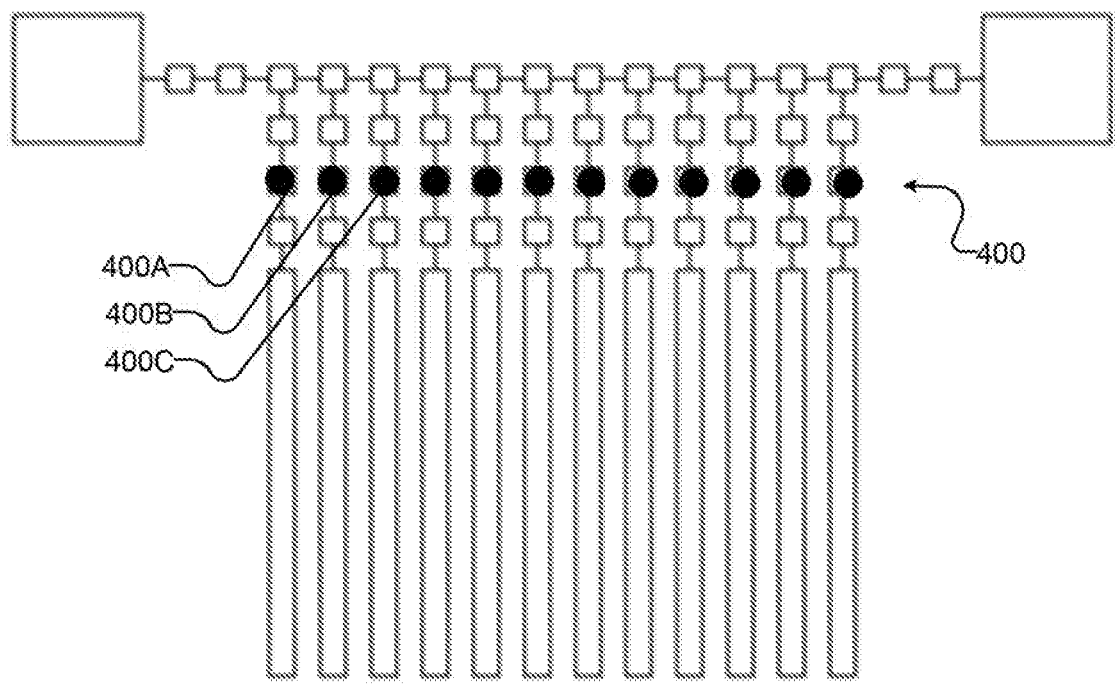
Figure 4D:
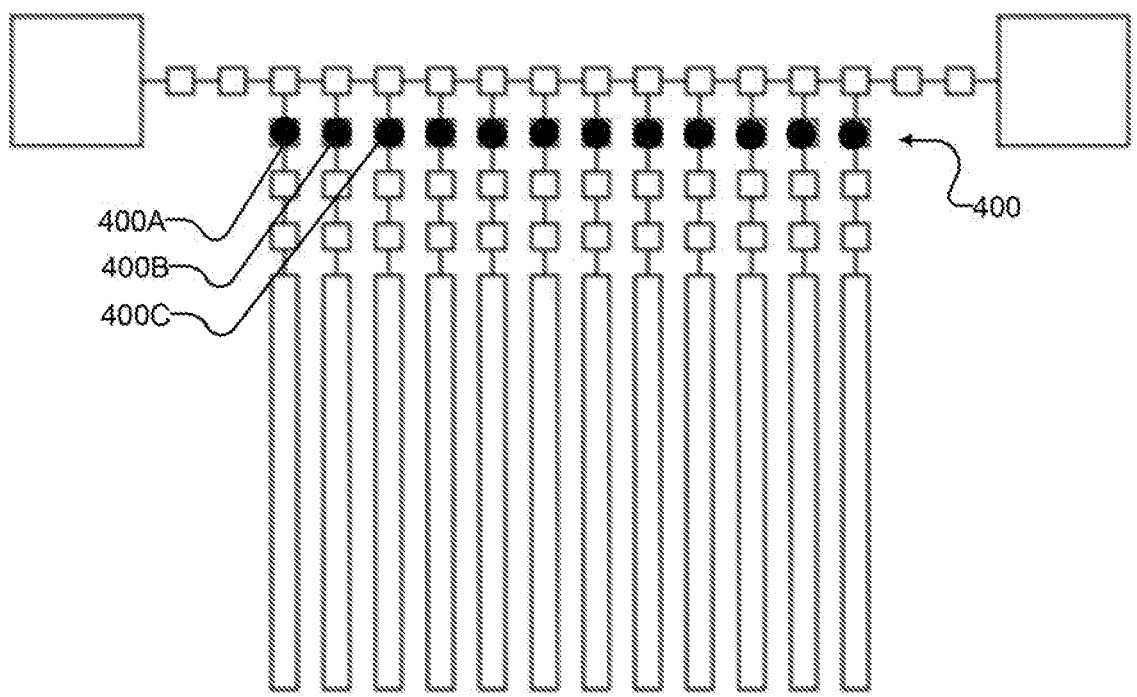
Figure 4E:
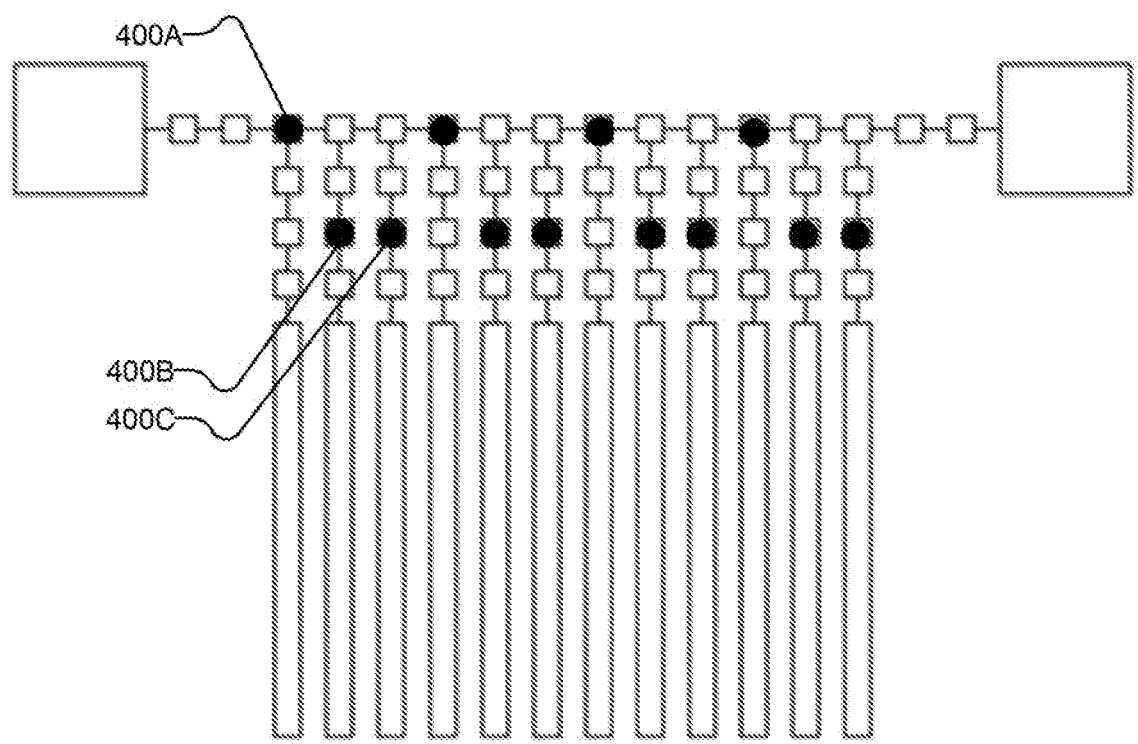
Figure 4F:
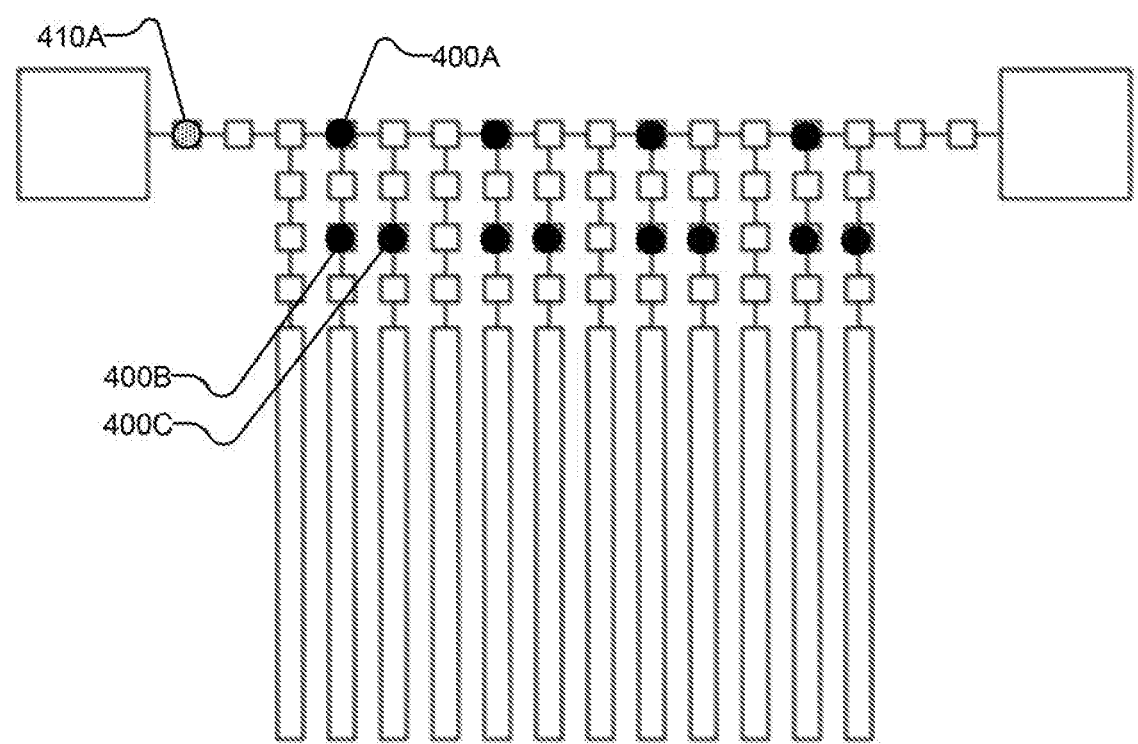
Figure 4G:
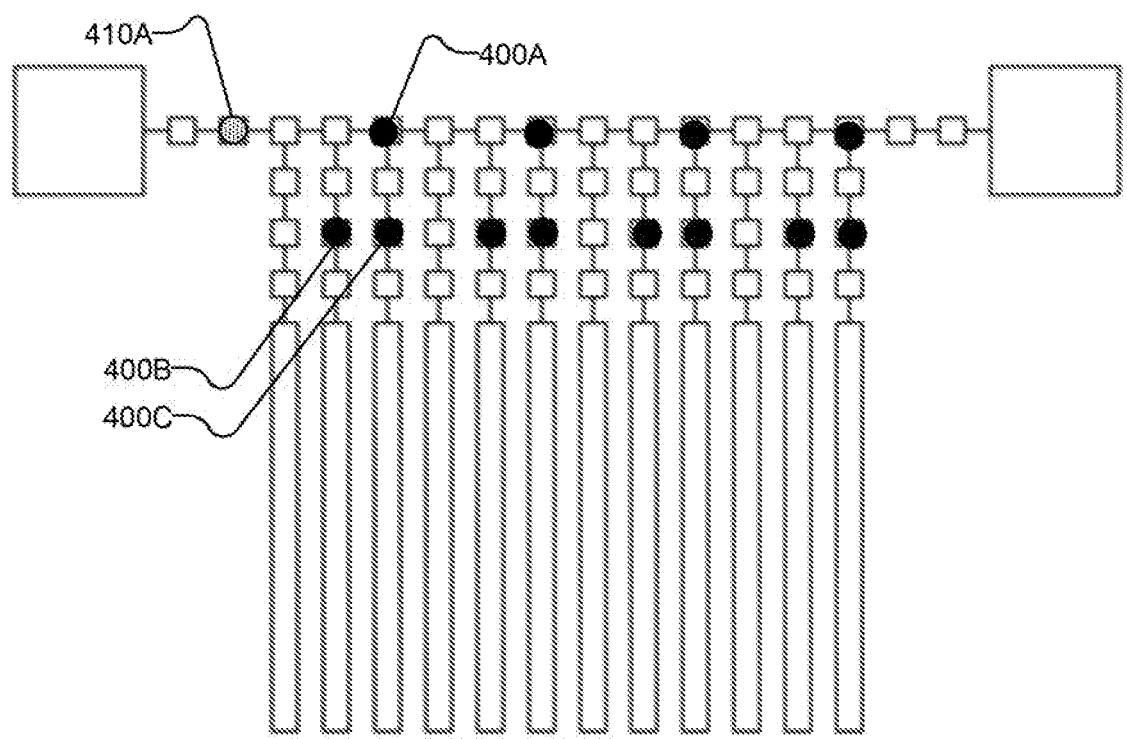
Figure 4H:
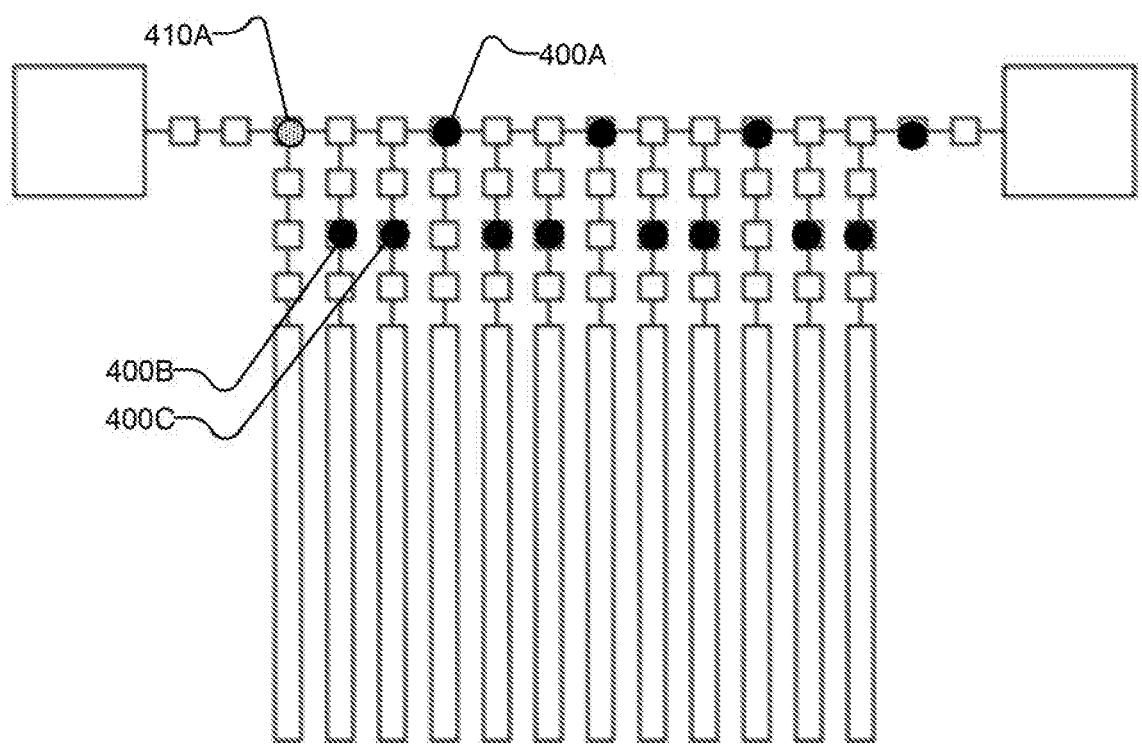
Figure 4I:
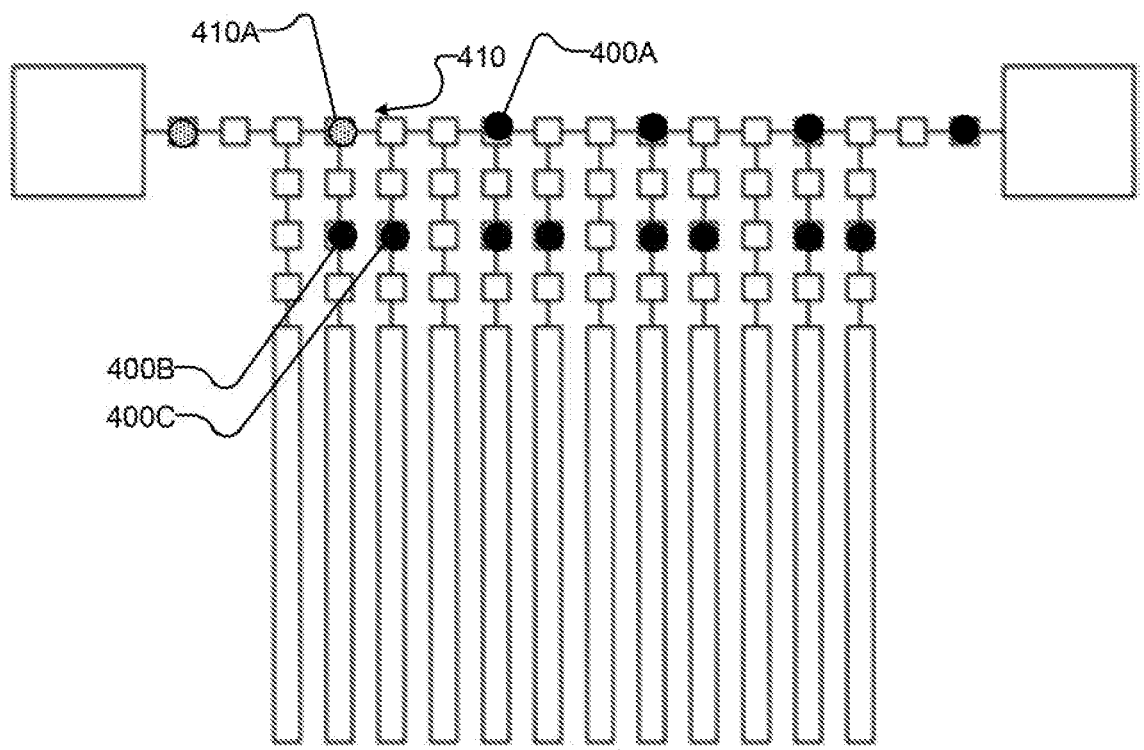
Figure 4J:
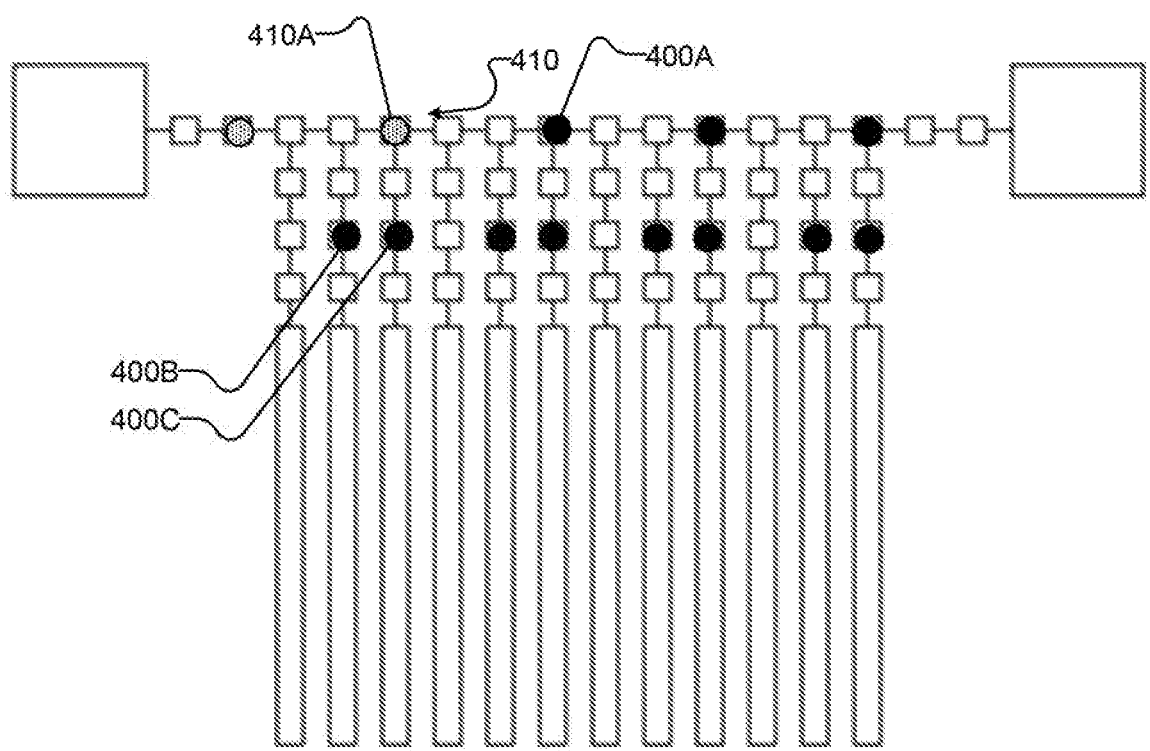
Figure 4K:
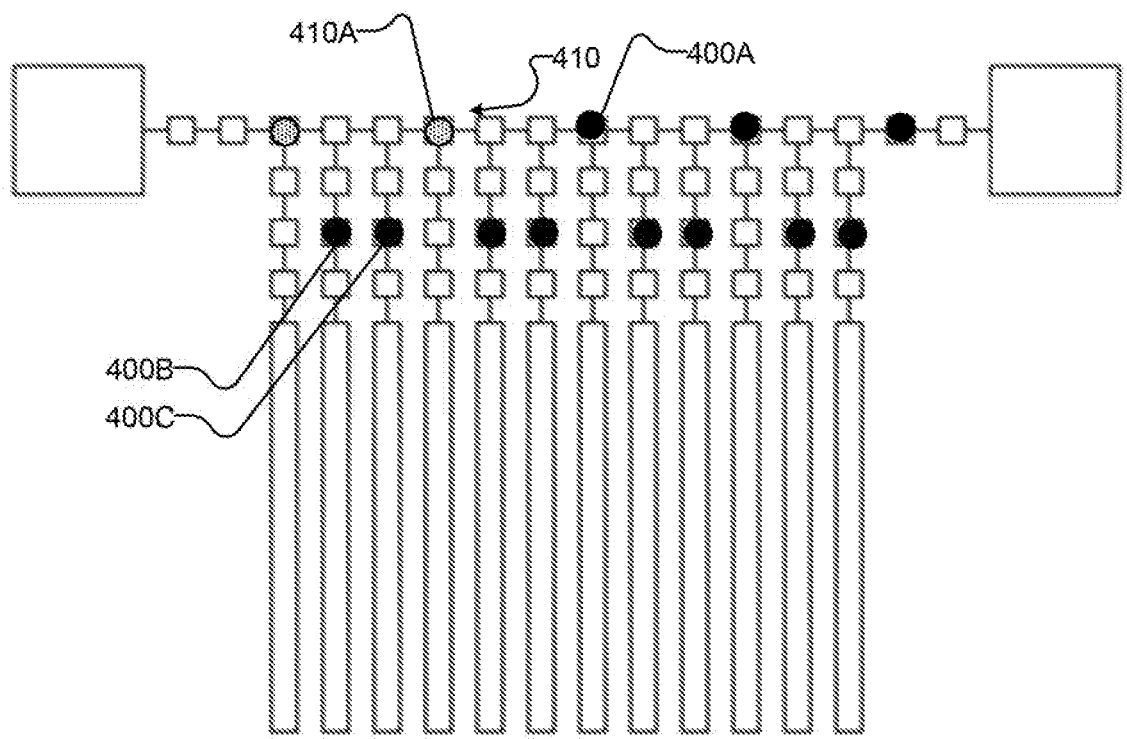
Figure 4L:
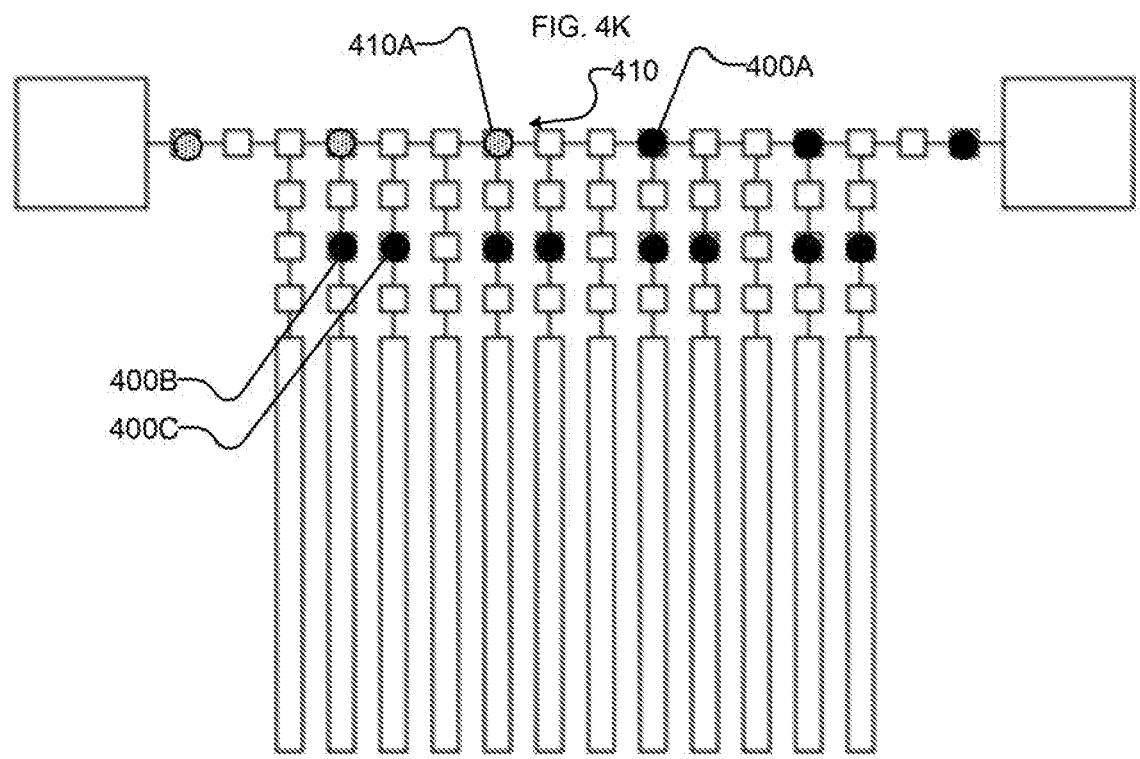
Figure 4M:
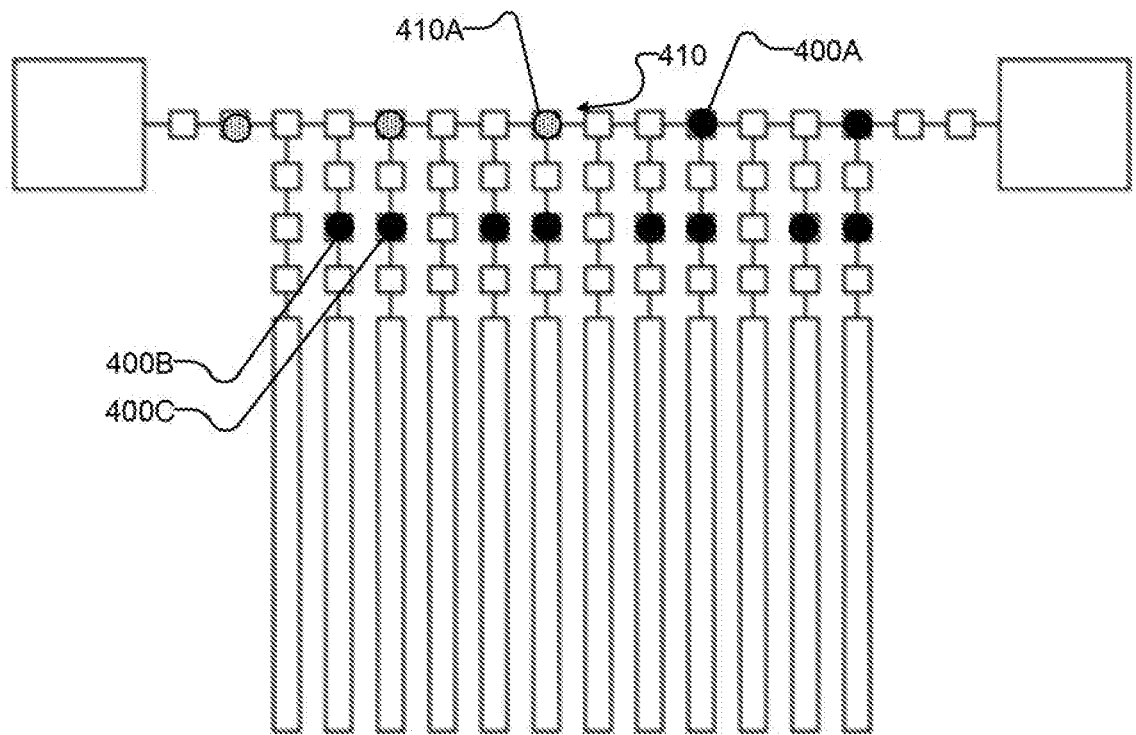
Figure 4N:
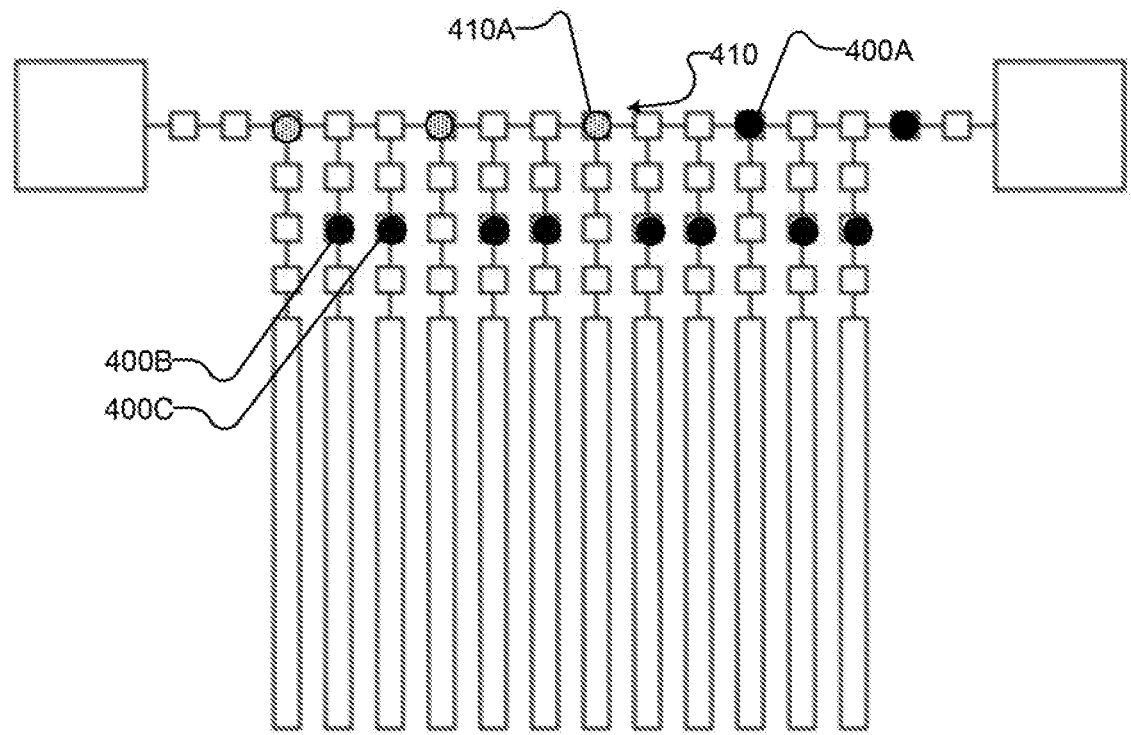
Figure 4O:
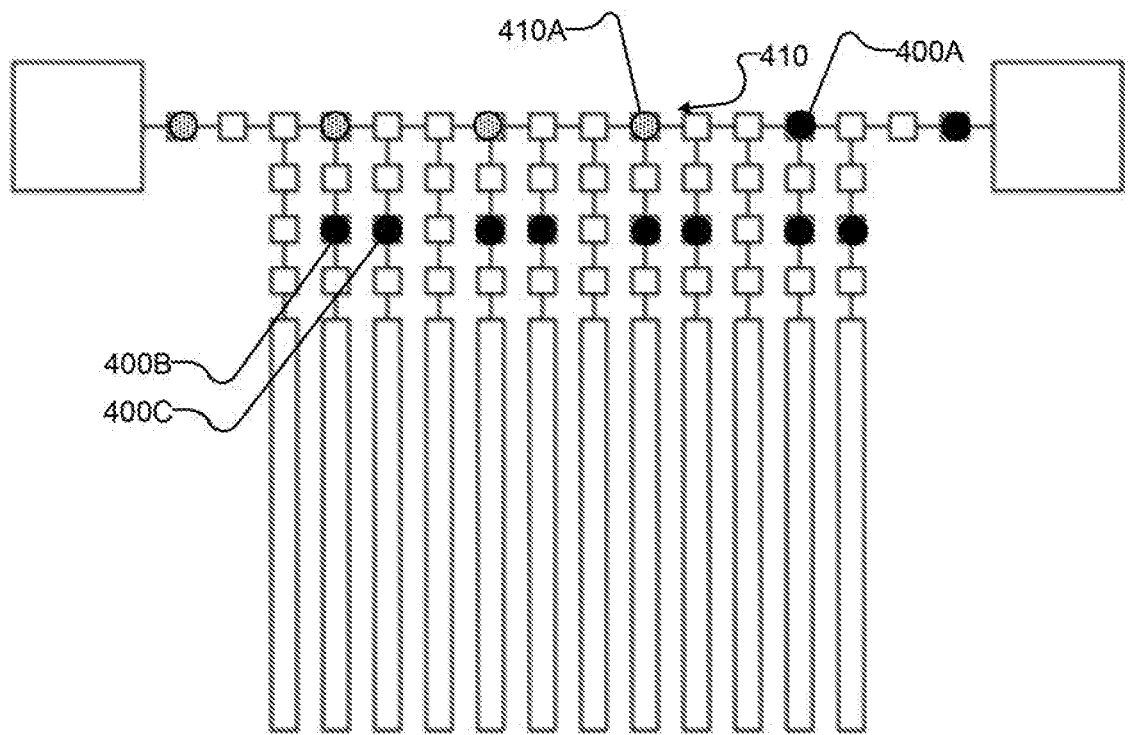
Figure 4P:
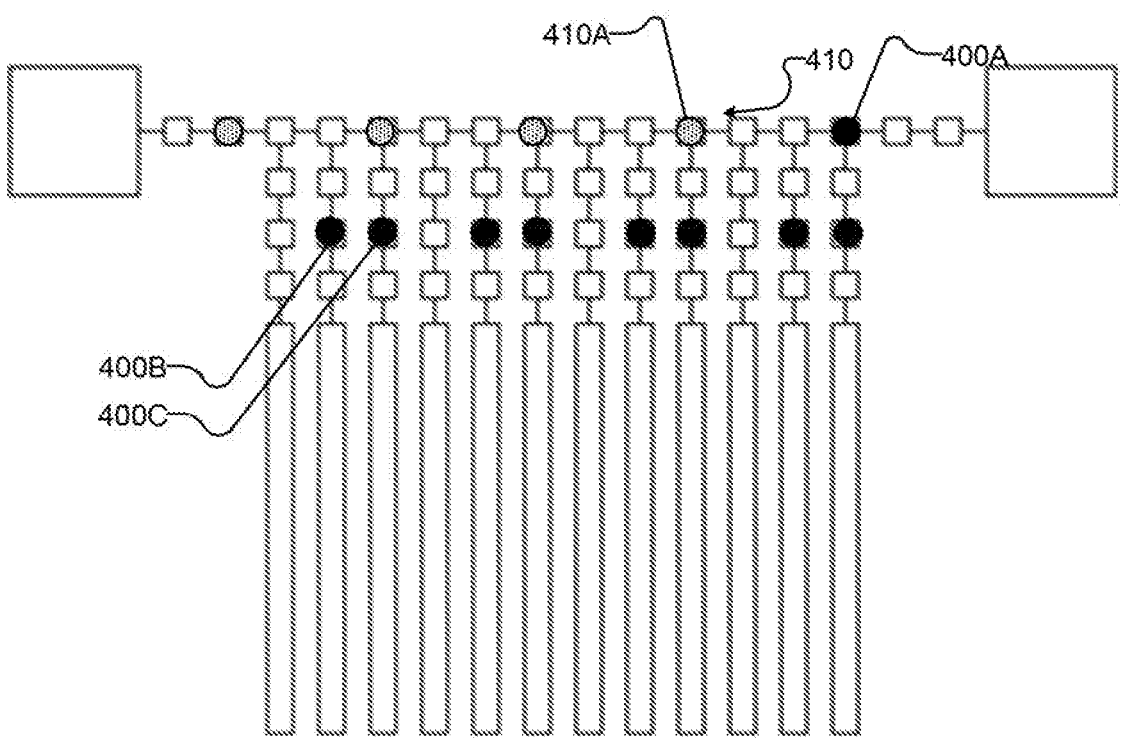
Figure 4Q:
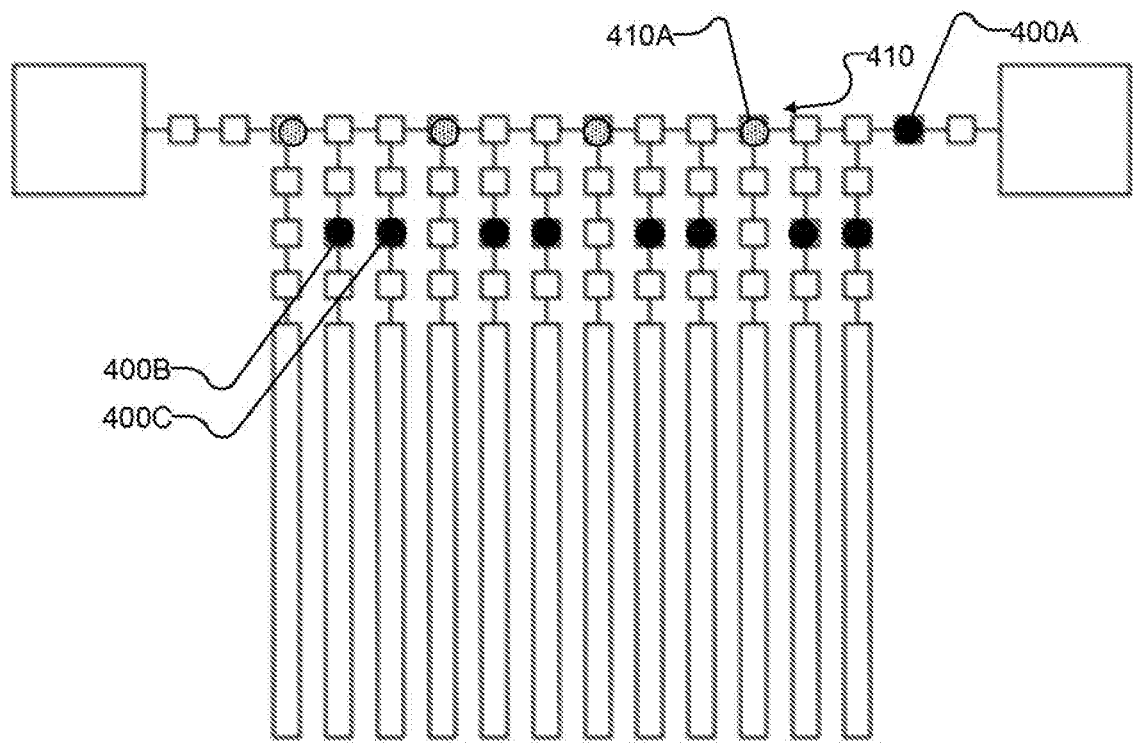
Figure 4R:
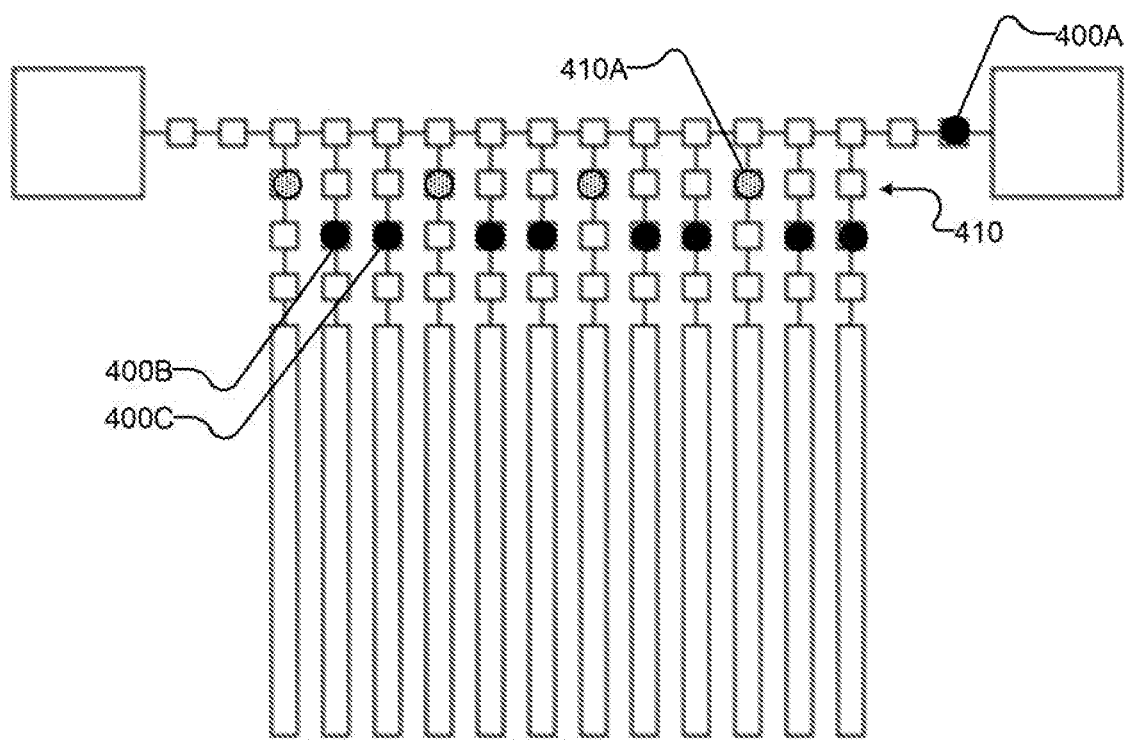
Figure 4S:
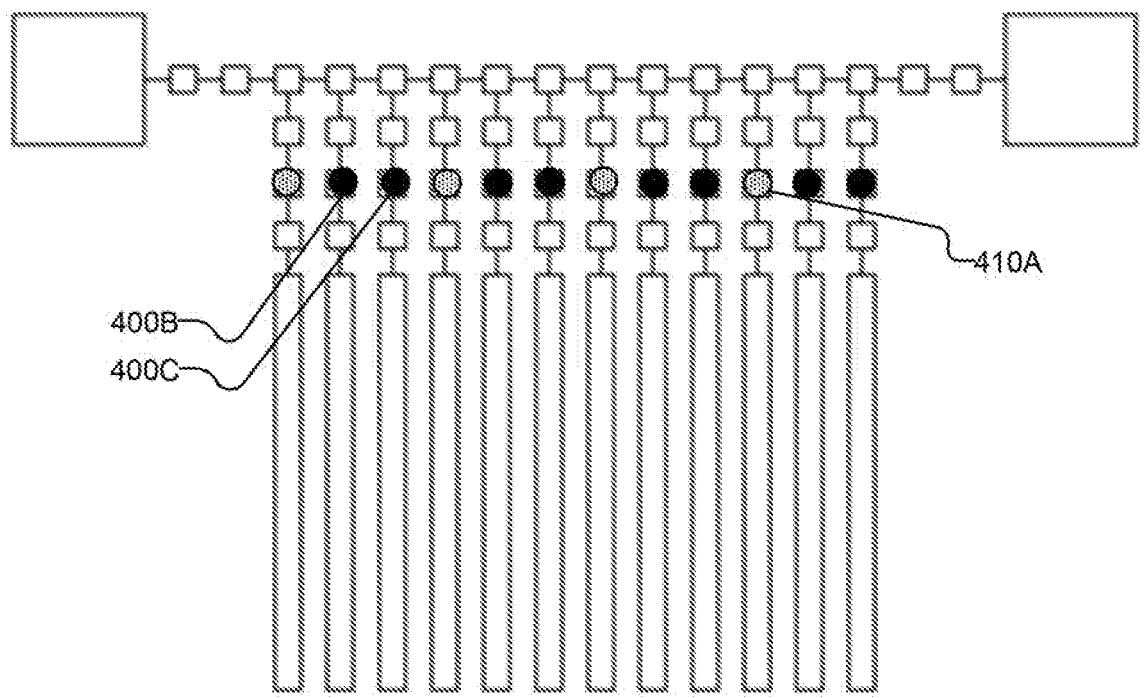
Figure 4T:
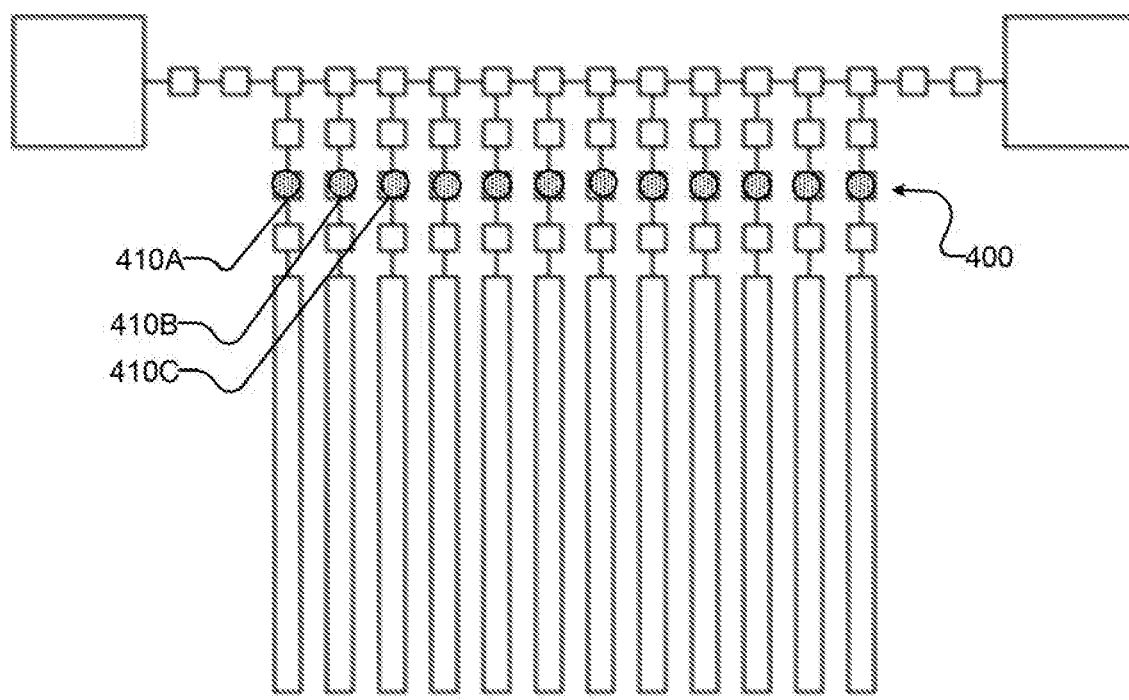
Figure 4U:
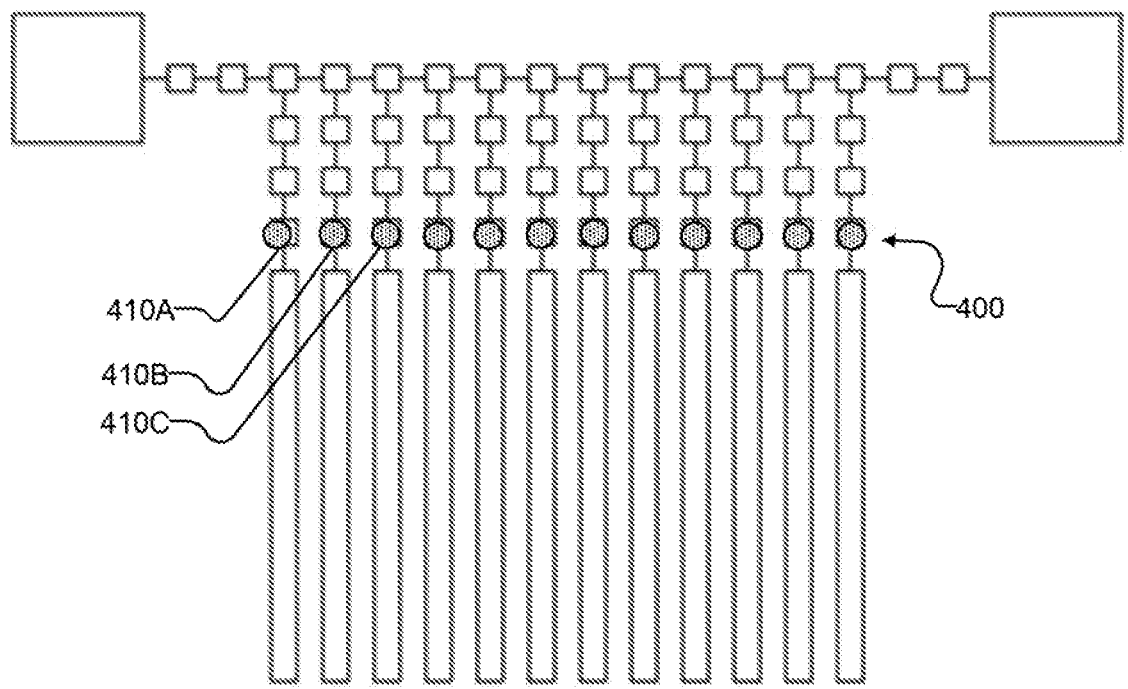
Figure 4V:
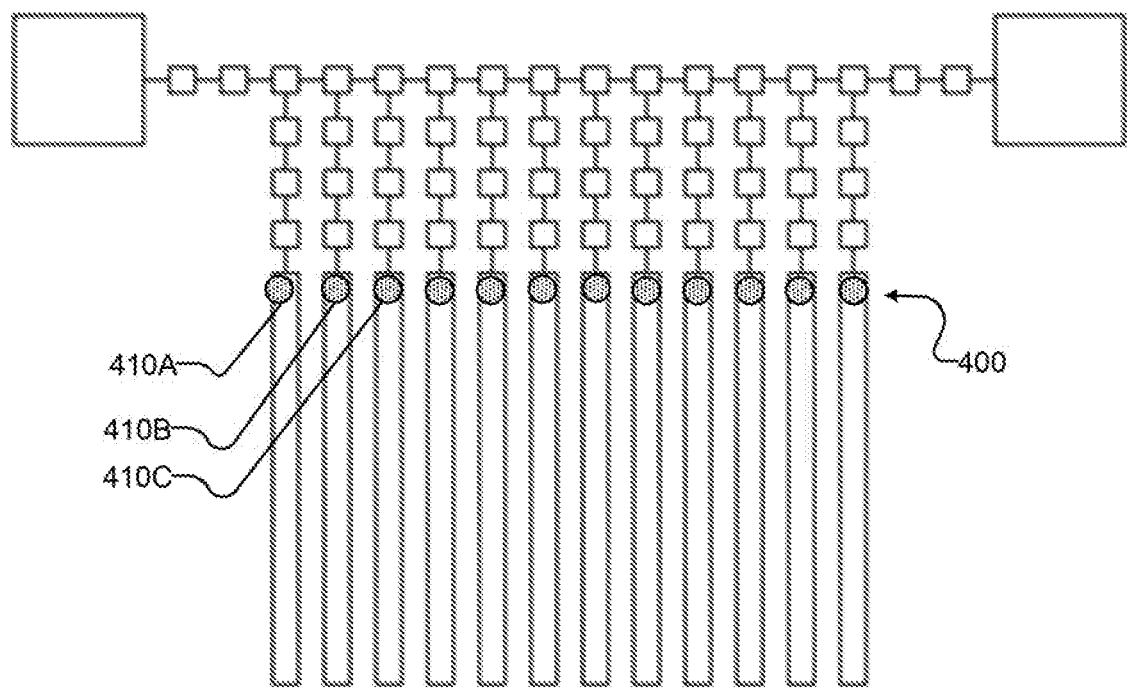

FIGS. 4A-4V (collectively and individually FIG. 4) are schematic diagrams showing an example implementation of the method of FIG. 3 as performed by an example implementation of the example I/O system of FIG. 2. In particular, FIGS. 4A-4V show an example sequence of states of the I/O system, as follows:

FIG. 4A shows schematically the example I/O system after the quantum processor has executed;

FIG. 4B shows schematically the example I/O system after the output state of the quantum processor has been read into qubit-proximate latches;

FIG. 4C shows schematically the example I/O system after the output state of the quantum processor has been shifted into intermediate latches;

FIG. 4D shows schematically the example I/O system after the output state of the quantum processor has been shifted into bus-proximate latches;

FIG. 4E shows schematically the example I/O system after a first portion of the output state of the quantum processor has been written to the bus;

FIGS. 4F-4Q each show schematically the example I/O system after successive iterations of shifting the first portion of the output state along the bus towards an output destination and reading a first portion of an input state along the bus from an input source;

FIG. 4R shows schematically the example I/O system after reading in the first portion of the input state to bus-proximate latches (and further shifting of the first portion of the input state);

FIG. 4S shows schematically the example I/O system after shifting the first portion of the input state to intermediate latches and completing read-out of the first portion of the output state from the bus; and FIG. 4T shows schematically the example I/O system after substantially repeating the events of FIGS. 4C-4S to read out the remaining portions of output state and read in further portions of input state.

FIG. 4U shows schematically the example I/O system to write an input state, for example synchronously with a read out of output state(s).

FIG. 4V shows schematically the example I/O system after substantially repeating the events of FIG. 4U to write an input state for example synchronously with a read out of output state(s).

DETAILED DESCRIPTION

Preamble

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Quantum Computing Architecture

In classical electrical circuits, complicated and elaborate operations may be carried out by a particular arrangement of simple switching devices, such as transistors. Examples of such arrangements include shift registers, memory arrays, adders, flip-flops, and the like. In the evolving field of superconducting electronics, and in particular superconducting quantum computing, it is essential to develop circuits that implement superconducting analogues of each of these arrangements. These arrangements may similarly be constructed using simple switching devices; however classical switching devices such as the transistor are not appropriate in the superconducting regime. Thus, in many superconducting systems it is important to establish a basic superconducting logic device with which many other circuits and operations may be realized.

An application of superconducting electronics that is of particular interest is in the field of quantum computing. Superconducting circuits are capable of exploiting quantum effects on a macroscopic scale, providing a mechanism for the implementation of quantum computation that is much more manageable than some of the alternatives. As discussed, the fundamental unit of quantum computation is the qubit.

Superconducting qubits may come in a variety of forms, including the superconducting flux qubit. A superconducting flux qubit may be realized in the form of a superconducting loop that contains at least one switching device known as a Josephson junction. A quantum processor may then comprise any number of such superconducting flux qubits. Thus, in implementing such a quantum processor, techniques for fabricating large numbers of superconducting flux qubits may be developed, as well as a solid understanding of the operation of such devices. The present systems, methods and apparatuses describe the use of the basic superconducting flux qubit structure as a superconducting switching device in a quantum processor. In an exemplary embodiment, an arrangement of superconducting flux qubits may be implemented as a superconducting flux-based shift register in a superconducting quantum processor. Examples of systems of devices implementing shift registers in quantum processors are provided by, for example, U.S. patent application Ser. No. 15/726,239, incorporated herein by reference.

Figure 1:
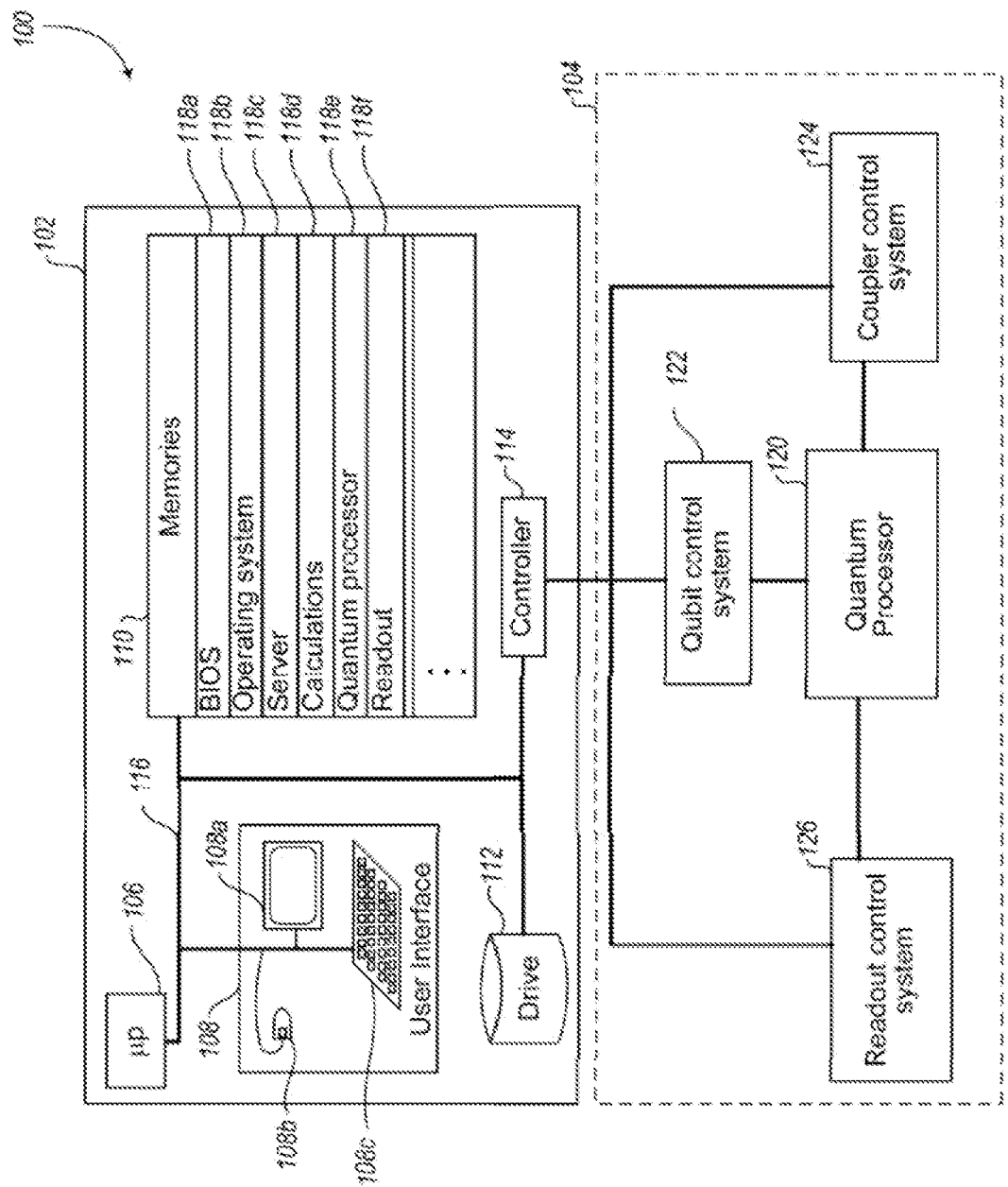
FIG. 1 shows schematically an example hybrid computing system including a classical or digital computer and a quantum computer.

FIG. 1 shows a hybrid computing system 100 according to at least one exemplary implementation, including a classical or digital computer 102 and a quantum computer 104, that may incorporate various logic devices and/or implement various addressing approaches described herein.

Digital computer 102 comprises one or more digital processors 106, for example one or more single- or multi-core microprocessors, central processor units (CPU), graphical processor units (GPUs), digital signal processors (DSPs), or application specific integrated circuits (ASICs). The digital computer 102 may include one or more user interface components, for example one or more displays 108a, pointer devices 108b (e.g., computer mouse, trackball), and keypads or keyboards 108c, collectively 108. The digital computer 102 may include one or more nontransitory computer- or processor-readable media, for example one or more memories (e.g., volatile memory, static memory, read only memory (ROM), random access memory (RAM)) 110 and/or one or more storage devices or storage drives (e.g., magnetic hard disk drives (HDDs), optical disk drives, solid state drives (SSD), and/or Flash drives) 112. The digital computer 102 may include one or more quantum computer control subsystems 114 that interfaces with the quantum computer 104. The processor(s) 106, memories 110, storage 112 and quantum computer control subsystems 114 may be communicatively coupled via one or more communications channels, for instance one or more buses (e.g., power buses, communications buses, instruction buses, address buses) 116.

The nontransitory computer- or processor-readable media, for example one or more memories 110, stores processor-executable instructions and data which, when executed by one or more processors 106, causes the processors 106 to execute one or more of the various algorithms described herein. The processor-executable instructions and data may, for example, include a basic input and output system set of instructions or "module" 118a which, when executed, configures the digital computer 102 for operation on boot up. The processor-executable instructions and data may, for example, include an operating system set of instructions or "module" 118b which, when executed, configures the digital computer 102 for operation, for instance providing various file management services and user interface services. The processor-executable instructions and data may, for example, include a server set of instructions or "module" 118c which, when executed, configures the digital computer 102 for operation as a server to provide access by other computers to information and services. The processor-executable instructions and data may, for example, include a calculations set of instructions or "module" 118d which, when executed, configures the digital computer 102 to perform various calculations associated with converting problems into a problem graph and/or post-processing of potential solutions generated by the quantum computer 104. The processor-executable instructions and data may, for example, include a quantum processor set of instructions or "module" 118e which, when executed, configures the digital computer 102 to map problems from a problem graph to a hardware graph for embedding in a quantum processor 120 of the quantum computer 104 for execution. The processor-executable instructions and data may, for example, include a read out set of instructions or "module" 118f which, when executed, configures the digital computer 102 to perform various read out functions associated with reading out potential solutions to problems from the quantum computer 104.

The quantum computer 104 comprises the quantum processor 120, which typically includes a plurality of qubits and a plurality of couplers, each coupler selectively operable to couple a respective pair of qubits. The quantum computer 104 includes a qubit control system 122, operatively coupled to control each of the qubits, for example via various interfaces, i.e., inductive interfaces that selectively couple a flux to the qubit. The quantum computer 104 includes a coupler control system 124, operatively coupled to control each of the couplers, for example via various interfaces, i.e., inductive interfaces that selectively couple a flux to the coupler to set a strength of coupling or "coupling strength" of the coupler. The quantum computer 104 includes a read-out control system 126, operatively coupled to control various interfaces operable to read out a state of each of the qubits.

There are various types of quantum processors, such as quantum annealing processors and gate-model quantum processors. Quantum annealing processors generally follow an annealing schedule, which may be determined by the digital computer 102. This process can be described in various ways (e.g., annealing some annealing-time variable s from 0 to 1, changing the energy of a transverse field, and/or mixing a problem Hamiltonian with a disordering Hamiltonian). A simple annealing schedule might involve linearly varying the state of the system (e.g., decrementing s, reducing the energy of the transverse field, and/or moving from a state where the disordering Hamiltonian dominates to one where the problem Hamiltonian dominates.) At least some implementations, quantum annealing processors can execute problems "in reverse"—e.g., starting in a classical state with low (e.g., zero) traverse field and annealing toward what would ordinarily be considered an initial state with a high transverse field (e.g., having an energy dominating the energy of the problem Hamiltonian). Examples of such reverse annealing techniques are provided by, for example, U.S. patent application Ser. No. 15/771,606.

Various respective systems, components, structures and algorithms for implementing such are described herein. Many of the described systems, components, structures and algorithms may be implemented individually, while some may be implemented in combination with one another.

Synchronous Input and Output for Quantum Processors

At a high level, at least some implementations of the present disclosure provide methods for operating quantum processors 120 whereby input and output are performed (e.g., substantially simultaneously) by an I/O system comprising one or more input interfaces and one or more output interfaces. For example, and as described in greater detail below, quantum processor 120 may execute a problem to generate a classical output state, which is read out at least partially by the I/O system. The I/O system also transmits a classical input state to devices proximate to at least some qubits of the quantum processor—which may be the same devices used for read-out. The classical input state is written to the qubits, and the quantum processor executes based on the classical input state (e.g., by performing reverse annealing to transform the classical input state to quantum state).

In suitable circumstances, and for appropriate implementations, such methods of operation can reduce the time required to program a quantum processor substantially. For example, in one implementation, the presently-disclosed techniques can reduce non-execution time (which dominates total operation time) by roughly half—a significant decrease. Systems capable of performing such methods will provide quantum processors capable of receiving classical states as input, such as quantum annealing processors capable of reverse annealing from classical input states to quantum states (which may then be annealed to a classical output state).

FIG. 2 is a schematic diagram of an example I/O system 200 for a quantum processor such as quantum processor 120 capable of performing at least some implementations of the methods disclosed herein. System 200 communicates with a higher-order I/O system 202; in FIG. 2, higher-order I/O system 202 is implemented by one or more input interfaces and one or more output interfaces, for instance including frequency-multiplexed resonators 202A, 202B (sometimes referred to as a FMRR architecture), to provide input and output although any suitable implementation providing the I/O functionality described below may be used. In other implementations, an input and an output may be provided by one or more input interfaces and one or more output interfaces in the form of frequency and sensitivity tunable resonators (FASTRs), and digital to analog converters (DACs).

System 200 comprises a bus 210 in communication with higher-order I/O system 202. Bus 210 may comprise, for example, shift registers arranged in series. (Such a bus may be called a "street".) Bus 210 is in communication with a plurality of qubits 220, e.g. via one or more latches. In the exemplary system 200 of FIG. 2, bus 210 is in communication with each qubit 220 via a series of latches comprising bus-proximate latch 212, intermediate latch 214, and qubit-proximate latch 216 (collectively and individually latches 212, 214, 216). The shift registers of bus 210 and/or latches 212, 214, 216 may comprise, for example, quantum flux parametrons (QFPs).

Shift registers of bus 210 and latches 212, 214, and 216 may be controlled individually or as groups. For example, in the exemplary system 200 of FIG. 2, shift registers 210A, 210B, and 210C are controllable independently of each other, as are latches 214A, 214B, and 214C. For instance, shift register 210A may be controllable as a member of a first subset of commonly-controlled shift registers of bus 210; shift registers 210B and 210C may similarly be controlled as members of further such subsets. In at least one implementation, shift register 210A is controlled by the same control signal as other latches 210 labelled "1" in FIG. 2 (with shift registers 210B and 210C having similar relationships with other latches labelled "2" and "3", respectively). Qubits 220A, 220B, and 220C are proximately coupled to shift registers 210A, 210B, 210C, respectively, and are identified in FIG. 2 for ease of reference.

In some implementations, such as system 200 depicted in FIG. 2, intermediate latches 214A, 214B, and 214C are independently-controllable substantially as described above with reference to shift registers 210. In FIG. 2, the labels "a", "b", "c" connote commonly-controlled subsets of intermediate latches 214. In at least some implementations, such as is depicted in FIG. 2, commonly-controlled subsets of intermediate latches 214 are aligned with commonly-controlled subsets of bus 210 (e.g., so that "a"-labelled latches 214A are in communication with bus 210 via corresponding "1"-labelled shift registers 210A, with "b" and "c" similarly corresponding to "2" and "3", respectively). In some implementations, latches 212 in communication with latches 214A, 214B, and 214C are commonly-controlled (depicted in FIG. 2 by latches 212 being labelled "u"). In some implementations, latches 216 in communication with latches 214A, 214B, and 214C are commonly-controlled (depicted in FIG. 2 by latches 212 being labelled "v").

Although the depicted exemplary system 200 of FIG. 2 provides three latches 212, 214, 216 communicatively coupling each qubit 220 to bus 210, and three commonly-controlled subsets of shift registers of bus 210 and intermediate latches 214, it will be appreciated that more or fewer latches 212, 214, 216 may be provided, as appropriate for the characteristics of a given system. For example, consider an implementation of system 200 wherein shift registers and latches 212, 214, 216 provide suppress and latch modes (e.g., as is the case for at least some QFPs), couplings between devices are undirected, and subsets of devices change modes substantially simultaneously. In such implementations, it can be convenient to divide shift registers of bus 210 into at least three subsets and to provide at least three latches 212, 214, 216 for each qubit 220 so that each shift register and intermediate latches 214 is proximately coupled only to independently-controllable devices (e.g., so that a shift register 210A is proximately coupled to shift registers 210B, 210C and intermediate latch 214A is proximately coupled to latches 212, 216). In other implementations, more or fewer devices may be preferable. For example, in implementations where couplings are directed and/or simultaneous shifting is supported without loss of data, it may be feasible to commonly-control all (and/or a contiguous series of) shift registers of bus 210, and/or to divide shift registers of bus 210 into two subsets.

In implementations where the shift registers of bus 210 and latches 212, 214, 216 comprise QFPs, setting these devices to suppressed and latched states may refer to controlling the circulating current within each QFP device. In particular, the circulating current may be controlled through flux bias lines in communication with a compound Josephson junction (CJJ) or another Josephson junction structure. A suppressed state is achieved where no flux is present in the CJJ, and no current is found in the loop of the QFP device. In the suppressed state, the current in the QFP device is not influenced by the current of the surrounding devices and remains at zero. This can also be considered "erasing" the state of the QFP. In contrast, a latched state is achieved where flux is introduced to the CJJ, resulting in the loop of the QFP device being capable of receiving circulating current. The direction of this circulating current will be determined by the current circulating in the neighboring devices. This can also be considered as "copying" the neighboring state. The flux within the CJJ may be determined by a flux bias line communicating with the CJJ structure.

In some implementations whereby coupling between qubits 220 and bus 210 are controllable by other techniques, latches 212, 214, 216 may be omitted.

System 200 can be used for output in general. When qubits 220 execute a problem, they can generate a classical state which can be transmitted to bus 210 (e.g., via latches 212, 214, 216) and transmitted along bus 210 to higher-order I/O system 202. For convenience, and without loss of generality, state will be described as being transmitted from left to right along bus 210 in FIG. 2, although other directions (such as right-to-left) are not excluded by the present disclosure.

FIG. 3 is a flowchart illustrating an example method 300 for synchronous input and output to a quantum processor. FIGS. 4A-4V (collectively and individually FIG. 4) illustrate an example implementation of method 300 as performed by an example implementation of system 200 of FIG. 2. At 302, a quantum processor (such as quantum processor 120) executes a problem. Executing a problem can be performed, for example, as described in various of the references identified herein, as otherwise known in the art, or as described herein; quantum annealing is one example of such execution. Execution results in generation of a classical state. At this moment, the state of the processor is held at least partially in qubits 220. This is depicted in FIG. 4A as output state 400 in qubits 220. For example, qubit 220A holds output state 400A, qubit 220B holds output state 400B, qubit 220C holds output state 400C, and so on, with output state 400 comprising output state 400A-400C and the state of any further qubits used for computing the problem.

At 304, system 200 reads at least a portion of output state 400 from qubits 220. At 306, system 200 writes at least a portion of output state 400 to bus 210. Acts 304 and 306 may be combined (e.g., by writing directly from qubits 220 to bus 210) and/or separate (e.g., by shifting state from qubits 220 to latches 212, 214, 216 at 304 and writing from latches 212, 214, 216 to bus 210 at 306).

FIGS. 4B-4E illustrate an example sequence of operations for performing acts 304 and 306 with system 200. In FIG. 4B, output state 400 is read out of qubits 220 into qubit-proximate latches 216. In at least one implementation, this comprises setting intermediate latches 214 to suppress (to avoid leakage of state) and qubit-proximate latches 216 to latch. In FIG. 4C, output state 400 is shifted to intermediate latches 214, e.g., by setting bus-proximate latches 212 to suppress and intermediate latches to latch. In FIG. 4D, output state 400 is shifted to bus-proximate latches 212, e.g., by setting shift registers of bus 210 to latch and qubit-proximate latches 216 to suppress. In FIG. 4E, a portion of output state 400 (namely the portion comprising output state 400A corresponding to a first commonly-controlled subset of shift registers of bus 210 comprising shift register 210A) is written to bus 210, e.g., by setting shift registers of bus 210 outside of the first subset of shift registers (e.g., the shift registers of subsets labelled "2" and "3" in FIG. 2, referred to herein as the second and third subsets of shift registers respectively) to suppress, a corresponding first subset of intermediate shift registers to suppress, and shift registers of bus 210 in the first subset of shift registers (e.g., shift register 210A and others in the subset labelled "1" in FIG. 2) to latch.

Other portions of output state 400, such as portions comprising output state 400B and 400C corresponding to latches 214 outside of the first subset of latches 214 (e.g., latches 214B, 214C and those labelled "b" or "c" in FIG. 2, referred to herein as the second and third subsets of latches 214 respectively) may be returned to corresponding latches 214 as shown by setting qubit-proximate latches 216 to suppress and setting the corresponding intermediate latches 214 to latch. In some implementations, such as certain implementations where latches 212 are not all commonly-controlled, this shuffling of portions of output state 400 in and out of intermediate latches 214 may be omitted, e.g., by suitably controlling subsets of latches 212.

Returning to FIG. 3, at 310 input state 410 (FIGS. 4I-4R) is received by the bus from higher-order I/O system 202 (at 312) and output state 400 is sent from the bus to higher-order I/O system 202 (at 314). Acts 312 and 314 may occur synchronously, which as used herein includes occurring simultaneously, at interleaved times, and/or at overlapping times.

FIGS. 4F-4Q illustrate an example sequence of operations for performing act 312 with system 200 and FIGS. 4F-4S illustrate an example sequence of operations for performing act 314 with system 200. In FIG. 4F, input state 410A is read in from higher-order I/O system 202 (e.g., on the left) and the first subset of output state 400 (said subset comprising output state 400A) is shifted along the bus (e.g., to the right in the view of the drawing sheet). Further units of input state are introduced in subsequent figures and are referred to together with input state 410A, collectively and individually, as input state 410. Shifting state 400, 410 along bus 210 may be performed by, e.g., setting the third subset of shift registers (comprising shift register 210A) and bus-proximate latches 214 to suppress and the second subset of shift registers (comprising shift register 210B) to latch.

FIGS. 4G-4Q each depict further iterations of shifting state 400, 410 along bus 410 by setting shift registers 210 on the "right" (i.e., in the direction of the link to higher-order I/O system 202 used for output and away from the link to higher-order I/O system 202 used for input) of each unit of state 400, 410 to latch and setting shift registers on the "left" (i.e., the opposing direction along bus 210) to suppress. Additional units of input state 410 are read in from higher-order I/O system 202 with spacing which corresponds to the spacing between shift registers of the first subset of shift registers, as shown in FIGS. 4I, 4L, and 4O. Units of output state 400 are read out by higher-order I/O system 202 as they reach it, as shown in FIGS. 4J, 4M, 4P (and, subsequently, at 4S). Bus-proximate latches 212 remain set to suppress through the operations of FIGS. 4G-4Q.

Returning to FIG. 3, at 320 system 200 reads at least a portion of input state 410 from bus 210. FIGS. 4R-4S illustrate an example sequence of operations for performing acts 320 and 322 with system 200. In FIG. 4R, input state 410 is read out of bus 410 into bus-proximate latches 212, e.g., by setting the third subset of shift registers to suppress and setting bus-proximate latches 212 to latch. (In the depicted example, the second subset of shift registers is also set to latch so as to continue shifting any units of output state 400 which are still on bus 210.) In FIG. 4S, input state 410 is shifted to intermediate latches 414 (and particularly to the first subset of intermediate latches 214, e.g., comprising intermediate latch 214A), e.g., by setting the first subset of shift registers and qubit-proximate latches 216 to suppress and the first subset of intermediate latches 214 to latch. (In the depicted example, the last unit of output state 410 on bus 410 is read out by higher-order I/O system 202 at substantially the same time, though it is not required that read-out of output state 400 be coincident with the operations on input state 410 depicted in FIG. 4S.)

The result of the foregoing acts of method 300 are that at least a portion of output state 400 has been read out to higher-order I/O system 202 and at least a corresponding portion of input state 410 has been synchronously read-in from higher-order I/O system 202. In implementations where only a portion is read-out at a time, method 300 may return to 304 to read-out (and read-in) a further portion. For example, returning to FIG. 4, FIG. 4T shows the result of repeating the foregoing twice (modifying, as necessary, the sequences of latch and suppress operations based on the different location of state 400, 410) to read-out the second subset of output state 400 (comprising state 400B) and the second subset of output state 400 (comprising state 400C) and read-in corresponding second and third subsets of input state 410 (comprising state 410B, 410C, respectively).

At 322 of method 300, input state 410 is written to qubits 220. This may be done all at once, or in portions (e.g., the first subset of input state 410 may be written to qubits 220 as they are received, if system 200 supports it). Acts 320 and 322 may be combined (e.g., by writing directly from bus 210 to qubits 220) and/or separate (e.g., by reading state from bus 210 to latches 212, 214, 216 at 320, and writing from latches 212, 214, 216 to qubits 220 at 322).

FIGS. 4U-V illustrate an example sequence of operations for performing act 322 with system 200. In FIG. 4U input state 410 is shifted to qubit-proximate latches 216, e.g., by setting bus-proximate latches 212 to suppress and qubit-proximate latches to latch. In FIG. 4V input state 410 is written to qubits 220, e.g., by setting intermediate latches 214 to suppress and qubits 220 to latch (and/or otherwise preparing qubits 220 to receive states, depending on their architecture).

At 330 of method 300, quantum processor 120 executes from an initial classical state—namely input state 410. For example, quantum processor may perform reverse annealing as described elsewhere herein, e.g., by reverse annealing to some annealing time s* and then performing some combination of forward annealing, pausing, and reverse annealing to produce a new output state 400, at which point method 300 or any other method for output (and/or, optionally, for input) may be performed.

Method 300 and/or system 200 make it possible, in certain circumstances, to avoid at least some of the overhead typically involved in reprogramming quantum processor 120. For example, in a machine learning application it may be necessary or desirable to sample from a statistical distribution (e.g., for training and/or inference), which may be represented as a problem executable by quantum processor 120, based on some number of binary inputs. Sampling may be performed according to method 300—i.e., by executing the problem to generate a sample at 302, performing synchronous read-out and input at 304-322, and generating a further sample by (in part) execution in reverse at 330. Completing generation of the further sample may involve further execution; for example, 330 may comprise reverse annealing from s=1 to s=s*, and further execution may comprise forward annealing from s=s* to s=1, where s* is some earlier point in the anneal (i.e., any point in [0,1)). Method 300 may be repeated upon generation of the further sample to expedite generation of yet further samples.

As another example, in a sampling application, given some samples for a problem (obtained via any suitable technique—such as executing quantum processor 120 at 302, sampling via a classical computer, and/or generating samples using a hybrid quantum-classical technique), the states of those samples may be programmed to qubits 220 (e.g. at 322). Quantum processor 220 can "explore the valley" near the input states at 330—i.e., search for low-energy solutions to the problem which are similar to the input states. This can, in appropriate circumstances, be a highly efficient way to improve sample diversity, which is desirable in a variety of applications.

In some implementations, method 300 comprises reading out only a first portion of qubits 220 (i.e., not reading out a second portion of qubits 220) prior to executing quantum processor 120 in reverse at 330. For example, a problem may be embedded on quantum processor 120 so that the first portion of qubits 220 do not require read-out via one or more subsets of shift registers of bus 210. For instance, the first portion of qubits 220 may be embedded to align generally with the first and second subsets of shift registers of bus 210, and to avoid alignment with the third subset of shift registers of bus 210. Method 300 may then comprise two iterations of acts 304-322 (to read out the first and second subsets of shift registers of bus 210) without necessarily requiring further iterations to read out remaining output state 400 corresponding to the third subset of shift registers of bus 210. This can reduce the combined reprogramming/read-out time by approximately one-third, relative to a scenario where all subsets of shift registers of bus 210 are read-out.

Such implementations may be suitable, for example, in certain machine learning applications and/or in other contexts. Given a problem Hamiltonian encoding "hidden" and "visible" variables, the problem may be embedded on quantum processor 120 so that the "hidden" variables correspond to a first subset of qubits 220 and the "visible" variables correspond to a second subset of qubits 220. Read-out may comprise reading out only the qubits 220 necessary to obtain the state of all visible variables (e.g., reading out all qubits 220 of the second subset, plus optionally any qubits which are incidentally read-out due to being coupled to the same subset of shift registers of bus 210 and/or for other reasons), and excluding at least some qubits 220 of the first subset from read-out. The qubits 220 of the second subset may be synchronously reprogrammed as described above. Qubits 220 may thus be left with an unmodified state. This may allow for the use of such qubits 220 (and correspondingly the variables they encode) to behave like a memory, as they may retain their state between anneals.

In some implementations, the first and second subsets of qubits are interleaved along a bus 210 (e.g., substantially similarly to the first and second subsets of shift registers of bus 210). In some implementations, the first and second subsets of qubits couple to separate busses and/or to separate contiguous regions of a bus 210, in which case method 300 may comprise reading out the second subset of qubits 220 as described herein and avoiding read-out (to the extent practicable) of the first subset of qubits 220. The state of the first subset of qubits 220 may be discarded, e.g., overwritten or otherwise not read out.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. patent application Ser. No. 15/726,239;
U.S. patent application Ser. No. 15/572,731;
U.S. patent application Ser. No. 15/771,606; and
U.S. Patent Application No. 62/851,377.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for synchronous input and output to a quantum processor, the quantum processor comprising a plurality of qubits coupleable to an input-output system comprising a bus, the method performed by the quantum processor and comprising:
  executing a problem by the quantum processor and thereby generate a first output state based on a problem represented by the quantum processor;
  reading at least a first portion of the first output state from at least a first subset of the qubits to the bus;
  transmitting the first portion of the first output state along the bus to an output destination;
  synchronously with transmitting the first portion of the first output state, transmitting at least a first portion of a first input state along the bus from an input source;
  writing the first portion of the first input state to the first subset of the qubits; and
  executing the problem by the quantum processor and thereby generate a second output state based on the first portion of the first input state.

2. The method of claim 1 wherein executing the problem based on the first portion of the first input state comprises executing the problem in reverse from the first input state to a second output state, the first input state comprising a classical state and the second output state comprising a quantum state.

3. The method of claim 2 wherein the quantum processor comprises a quantum annealing processor and executing the problem in reverse comprises reverse annealing.

4. The method of claim 3 wherein executing the problem and thereby generate a second output state comprises generating a first intermediate state by reverse annealing and generating the second output state, at least in part, by forward annealing.

5. The method of claim 1 wherein the bus comprises a plurality of shift registers and transmitting the at least a first portion of the first input state along the bus synchronously with transmitting the first portion of the first output state along the bus comprises synchronously shifting the first portion of the first input state and the first portion of the first output state along the bus.

6. The method of claim 1 wherein the input-output system comprises a plurality of latches, the plurality of qubits coupleable to the bus via the plurality of latches, and reading at least the first portion of the first output state from at least the first subset of the qubits to the bus comprises:
  reading the first output state from the plurality of qubits to the plurality of latches, and
  reading at least the first portion of the first output state from at least a first subset of the plurality of latches to the bus, the at least the first subset of the plurality of latches corresponding to the at least the first subset of the qubits.

7. The method of claim 6 further comprising storing at least a second portion of the first output state by the plurality of latches while transmitting at least some of the first portion of the first output state along the bus.

8. The method of claim 5 wherein synchronously shifting the first portion of the first input state and the first portion of the first output state along the bus comprises setting a first subset of the plurality of shift registers to latch and setting a second subset of the plurality of shift registers to suppress.

9. The method of claim 8 wherein setting the first subset of the plurality of shift registers to latch comprises setting a first latched shift register to latch, the first latched shift register neighboring a first holding shift register in a first direction, and setting the second subset of the plurality of shift registers to suppress comprises setting a first suppressed shift register to suppress, the first suppressed shift register neighboring the first holding shift register in a second direction opposing the first direction, the first holding shift register holding a unit of the first portion of the first input state.

10. The method of claim 9 wherein setting the first subset of the plurality of shift registers to latch comprises setting a second latched shift register to latch, the second latched shift register neighboring a second holding shift register in the first direction, and setting the second subset of the plurality of shift registers to suppress comprises setting a second suppressed shift register to suppress, the first suppressed shift register neighboring the second holding shift register in the second direction opposing the first direction, the second holding shift register holding a unit of the first portion of the first output state.

11. The method of claim 9 wherein synchronously shifting the first portion of the first input state and the first portion of the first output state along the bus comprises synchronously shifting the first portion of the first input state and the first portion of the first output in the first direction.

12. The method of claim 1 further comprising:
reading at least a first portion of the second output state from at least the first subset of the qubits to the bus;
transmitting the first portion of the second output state along the bus to the output destination;
synchronously with transmitting the first portion of the second output state, transmitting at least a first portion of a second input state along the bus from the input source;
writing the first portion of the second input state to the first subset of the qubits; and
executing the problem and thereby generating a third output state based on the first portion of the second input state.

13. The method of claim 1 further comprising discarding at least a second portion of the first output state.

14. A computing system comprising:
at least one processor in communication with a quantum processor, the quantum processor comprising a plurality of qubits coupleable to an input-output system comprising a bus;
at least one nontransitory processor-readable medium communicatively coupled to the at least one processor, the at least one nontransitory processor-readable medium storing at least one of processor-executable instructions or data which, when executed by the at least one processor, cause the at least one processor to cause the quantum processor to:
execute a problem by the quantum processor and thereby generate a first output state based on a problem represented by the quantum processor;
read at least a first portion of the first output state from at least a first subset of the qubits to the bus;
transmit the first portion of the first output state along the bus to an output destination;
synchronously with transmitting the first portion of the first output state, transmit at least a first portion of a first input state along the bus from an input source;
write the first portion of the first input state to the first subset of the qubits; and
execute the problem by the quantum processor and thereby generate a second output state based on the first portion of the first input state.

15. The computing system of claim 14 wherein the at least one processor causes the quantum processor to execute the problem in reverse from the first input state to a second output state, the first input state comprising a classical state and the second output state comprising a quantum state.

16. The computing system of claim 15 wherein the quantum processor comprises a quantum annealing processor and the at least one processor causes the quantum annealing processor to execute the problem in reverse by reverse annealing.

17. The computing system of claim 16 wherein the at least one processor causes the quantum processor to generate a first intermediate state by reverse annealing and generate the second output state, at least in part, by forward annealing.

18. The computing system of claim 14 wherein the bus comprises a plurality of shift registers and the at least one processor causes the quantum processor to synchronously shift the first portion of the first input state and the first portion of the first output state along the bus.

19. The computing system of claim 18 wherein the input-output system comprises a plurality of latches, the plurality of qubits coupleable to the bus via the plurality of latches, and the at least one processor causes the quantum processor to:
read the first output state from the plurality of qubits to the plurality of latches, and
read at least the first portion of the first output state from at least a first subset of the plurality of latches to the bus, the at least the first subset of the plurality of latches corresponding to the at least the first subset of the qubits.

20. The computing system of claim 19 wherein the at least one processor further causes the quantum processor to store at least a second portion of the first output state by the plurality of latches while the quantum processor transmits at least some of the first portion of the first output state along the bus.

21. The computing system of claim 20 wherein the at least one processor causes the quantum processor to set a first subset of the plurality of shift registers to latch and set a second subset of the plurality of shift registers to suppress to synchronously shift the first portion of the first input state and the first portion of the first output state along the bus.

22. The computing system of claim 21 wherein the at least one processor further causes the quantum processor to set a first latched shift register to latch, the first latched shift register neighboring a first holding shift register in a first direction, and set a first suppressed shift register to suppress, the first suppressed shift register neighboring the first holding shift register in a second direction opposing the first direction, the first holding shift register holding a unit of the first portion of the first input state.

23. The computing system of claim 22 wherein the at least one processor further causes the quantum processor to set a second latched shift register to latch, the second latched shift register neighboring a second holding shift register in the first direction, and set a second suppressed shift register to suppress, the second suppressed shift register neighboring the second holding shift register in the second direction opposing the first direction, the second holding shift register holding a unit of the first portion of the first output state.

24. The computing system of claim 23 wherein the at least one processor further causes the quantum processor to shift the first portion of the first input state and the first portion of the first output in the first direction.

25. The computing system of claim 14, wherein the at least one processor further causes the quantum processor to:
read at least a first portion of the second output state from at least the first subset of the qubits to the bus;
transmit the first portion of the second output state along the bus to the output destination;
synchronously with transmitting the first portion of the second output state, transmit at least a first portion of a second input state along the bus from the input source;
write the first portion of the second input state to the first subset of the qubits; and
execute the problem and thereby generating a third output state based on the first portion of the second input state.

26. The computing system of claim 14, wherein the at least one processor further causes the quantum processor to discard at least a second portion of the first output state.

27. An input-output system for a quantum processor, the quantum processor comprising a plurality of qubits, the input-output system comprising:
an input interface and an output interface;
a bus connected between the input interface and the output interface; and
a plurality of latches, the bus being communicatively coupled to the plurality of qubits by the plurality of latches;
wherein the plurality of latches comprises a bus proximate latch, an intermediate latch, and a qubit proximate latch, the qubit proximate latch being coupled to the plurality of qubits, the intermediate latch being coupled to the qubit proximate latch and the bus proximate latch, and the bus proximate latch being coupled to the bus.

28. The input-output system of claim 27, wherein the input interface and the output interface each comprise one of a frequency-multiplexed resonator, a frequency and sensitivity tunable resonator, and a digital to analog converter.

29. The input-output system of claim 28, wherein the bus comprises a first plurality of shift registers arranged in series and wherein each latch of the plurality of latches comprises a second plurality of shift registers arranged in series.

30. The input-output system of claim 29, wherein each shift register of the first and second plurality of shift registers comprises a quantum flux parametron.

31. The input-output system of claim 30, wherein each quantum flux parametron is addressed by a flux bias line, and wherein each quantum flux parametron has a suppressed state wherein the flux bias line introduces zero flux and a latched state wherein the flux bias line introduces non-zero flux.

32. The input-output system of claim 31, wherein each shift register of the first and second plurality of shift registers is controllable by at least one of: individually, as subsets of commonly-controlled shift registers, and in groups of shift registers that are in series.

33. The input-output system of claim 32, wherein each shift register of the first and second plurality of shift registers is proximately coupled only to independently-controllable shift registers.

* * * * *